United States Patent
Kung et al.

(10) Patent No.: US 11,082,116 B1
(45) Date of Patent: Aug. 3, 2021

(54) METHOD AND APPARATUS FOR HANDLING BEAM FAILURE RECOVERY REGARDING MEDIUM ACCESS CONTROL RESET IN A WIRELESS COMMUNICATION SYSTEM

(71) Applicant: ASUSTek Computer Inc., Taipei (TW)

(72) Inventors: Yi-Hsuan Kung, Taipei (TW); Yu-Hsuan Guo, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 0 days.

(21) Appl. No.: 17/122,420

(22) Filed: Dec. 15, 2020

Related U.S. Application Data

(60) Provisional application No. 62/960,959, filed on Jan. 14, 2020, provisional application No. 62/960,968, filed on Jan. 14, 2020.

(51) Int. Cl.
| | |
|---|---|
| *H04B 7/06* | (2006.01) |
| *H04W 76/19* | (2018.01) |
| *H04W 76/27* | (2018.01) |
| *H04W 72/12* | (2009.01) |
| *H04W 80/02* | (2009.01) |
| *H04W 84/18* | (2009.01) |

(52) U.S. Cl.
CPC ...... *H04B 7/0695* (2013.01); *H04W 72/1268* (2013.01); *H04W 76/19* (2018.02); *H04W 76/27* (2018.02); *H04W 80/02* (2013.01); *H04W 84/18* (2013.01)

(58) Field of Classification Search
CPC ............ H04B 7/0695; H04W 72/1268; H04W 76/27; H04W 80/02; H04W 76/19; H04W 84/18
See application file for complete search history.

(56) References Cited

U.S. PATENT DOCUMENTS

| | | | |
|---|---|---|---|
| 2019/0207667 A1* | 7/2019 | Zhou | H04W 24/10 |
| 2020/0137821 A1* | 4/2020 | Cirik | H04B 17/327 |
| 2020/0145280 A1* | 5/2020 | Cirik | H04L 41/0668 |
| 2020/0221323 A1* | 7/2020 | Xu | H04L 5/0048 |
| 2021/0013949 A1* | 1/2021 | Agiwal | H04W 80/02 |

FOREIGN PATENT DOCUMENTS

| | | |
|---|---|---|
| WO | 2019184629 | 3/2019 |
| WO | 2020028792 | 2/2020 |

* cited by examiner

*Primary Examiner* — Will W Lin
(74) *Attorney, Agent, or Firm* — Cooper Legal Group, LLC

(57) ABSTRACT

A method and device are disclosed from the perspective of a User Equipment (UE). In one embodiment, the method includes the UE triggering a Beam Failure Recovery (BFR) associated with a cell. The method also includes the UE triggering a Scheduling Request (SR) for Secondary Cell (SCell) beam failure recovery in response to the triggered BFR. The method further includes the UE cancelling the triggered BFR and the triggered SR in response to reset of a Medium Access Control (MAC) entity associated with the cell.

20 Claims, 13 Drawing Sheets

METHOD AND APPARATUS FOR HANDLING BEAM FAILURE RECOVERY REGARDING MEDIUM ACCESS CONTROL RESET IN A WIRELESS COMMUNICATION SYSTEM

CROSS-REFERENCE TO RELATED APPLICATIONS

The present Application claims the benefit of U.S. Provisional Patent Application Ser. Nos. 62/960,959 and 62/960,968 filed on Jan. 14, 2020, the entire disclosures of which are incorporated herein in their entirety by reference.

FIELD

This disclosure generally relates to wireless communication networks, and more particularly, to a method and apparatus for handling beam failure recovery regarding medium access control reset in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

A method and device are disclosed from the perspective of a User Equipment (UE). In one embodiment, the method includes the UE triggering a Beam Failure Recovery (BFR) associated with a cell. The method also includes the UE triggering a Scheduling Request (SR) for Secondary Cell (SCell) beam failure recovery in response to the triggered BFR. The method further includes the UE cancelling the triggered BFR and the triggered SR in response to reset of a Medium Access Control (MAC) entity associated with the cell.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, 3GPP NR (New Radio), or some other modulation techniques.

In particular, the exemplary wireless communication systems devices described below may be designed to support one or more standards such as the standard offered by a consortium named "3rd Generation Partnership Project" referred to herein as 3GPP, including: TS 38.321 V15.7.0 "NR, Medium Access Control (MAC) protocol specification"; R2-1915254, "MAC Running CR for NR eMIMO", Samsung; R1-1909833, "Reply LS on MAC CE design for SCell BFR", Apple; RAN2 #108 meeting report; RAN2 #107bis meeting report; and TS 38.331 V15.7.0, "NR, Radio Resource Control (RRC) protocol specification". The standards and documents listed above are hereby expressly incorporated by reference in their entirety.

Figure 1:
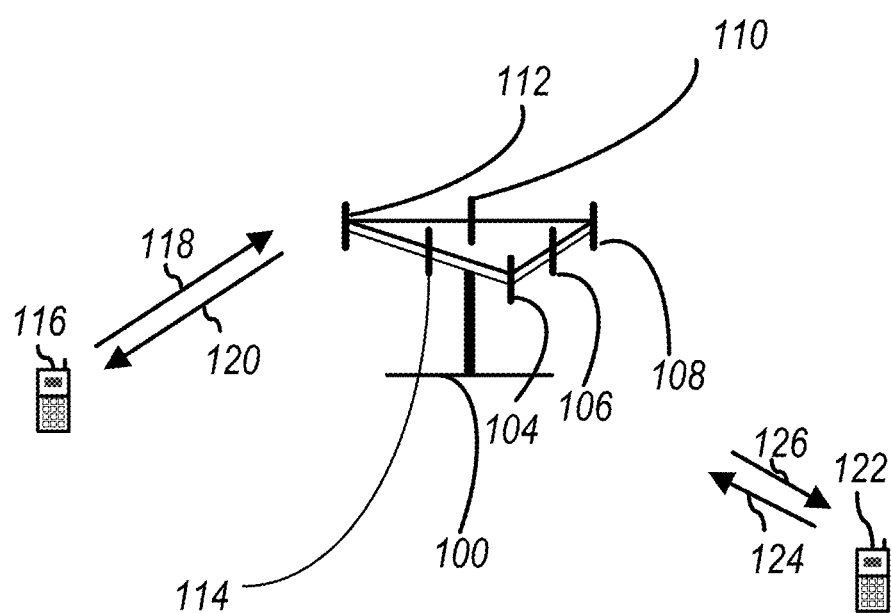
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), a network node, a network, or some other terminology. An access terminal (AT) may also be called user equipment (UE), a wireless communication device, terminal, access terminal or some other terminology.

Figure 2:
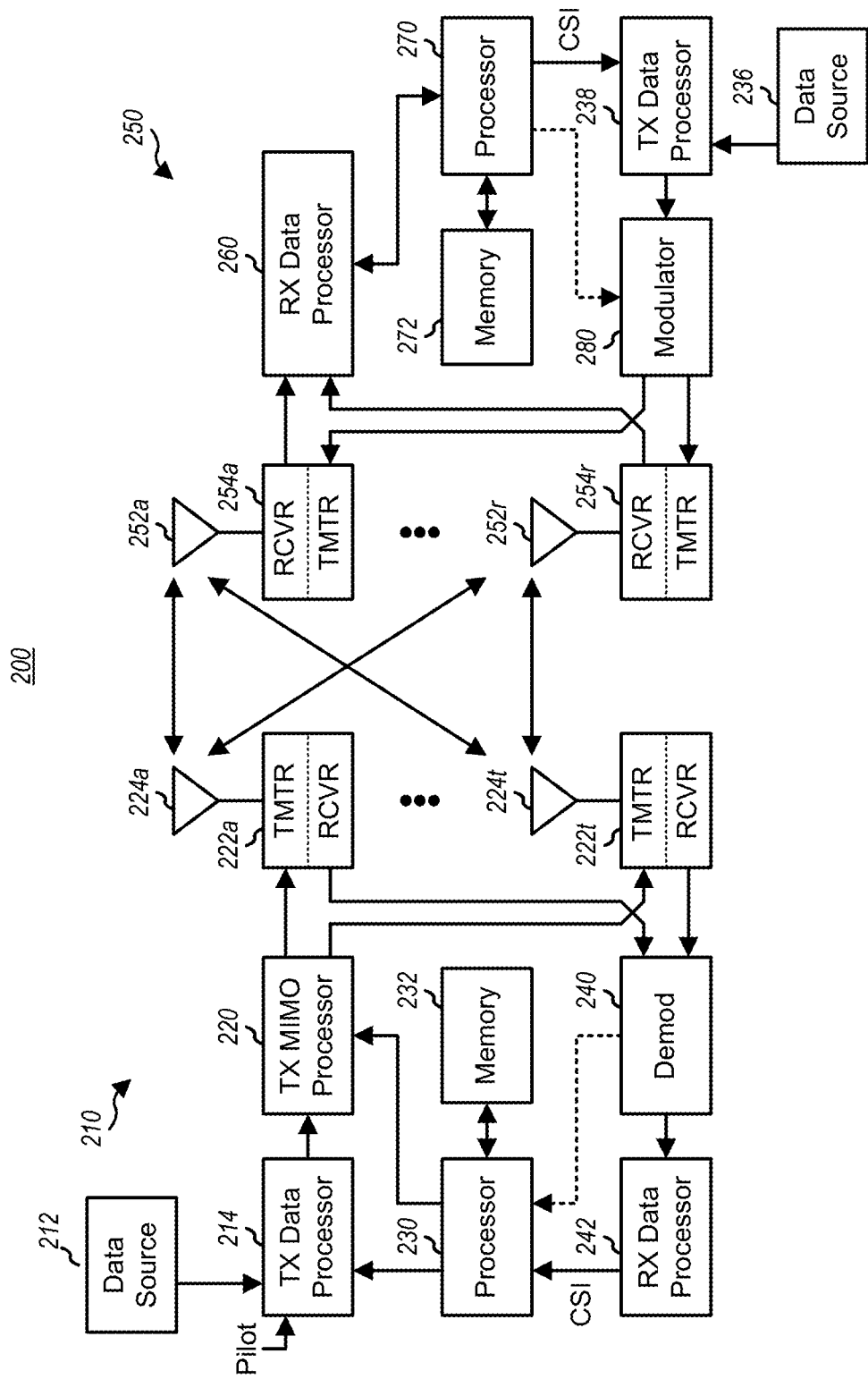
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
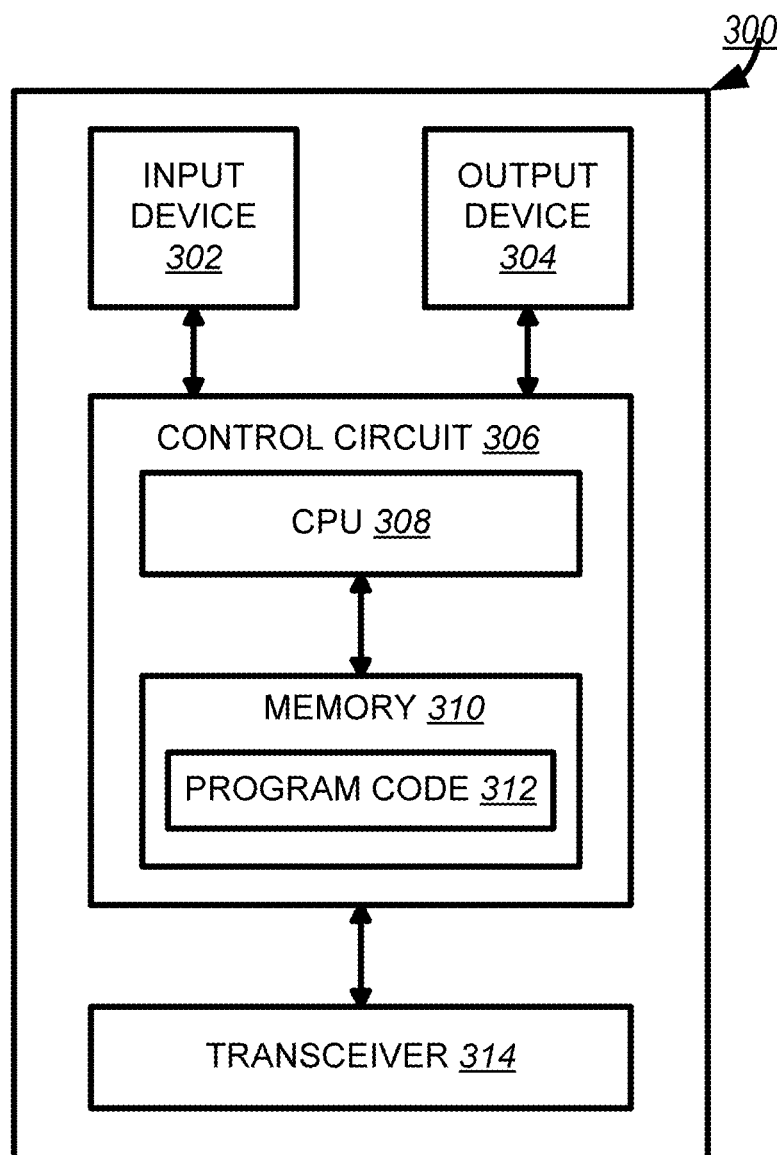
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
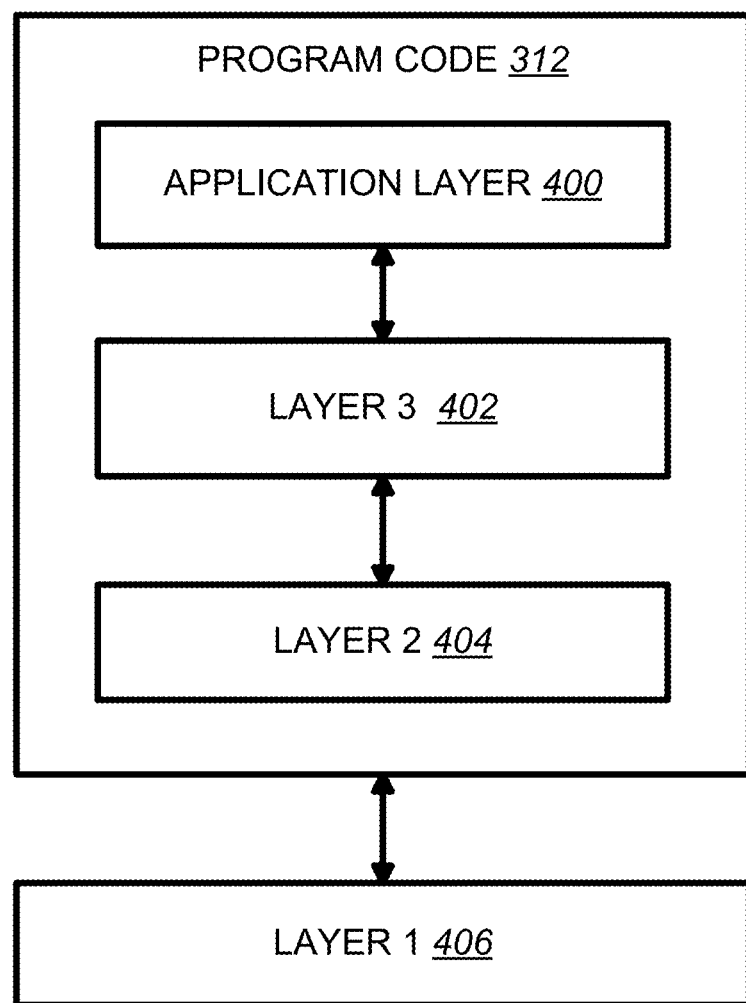
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

Uplink (UL) data transfer for NR is introduced in 3GPP TS 38.321 as follows:

5.4 UL-SCH Data Transfer 5.4.1 UL Grant Reception

Uplink grant is either received dynamically on the PDCCH, in a Random Access Response, or configured semi-persistently by RRC. The MAC entity shall have an uplink grant to transmit on the UL-SCH. To perform the requested transmissions, the MAC layer receives HARQ information from lower layers.

If the MAC entity has a C-RNTI, a Temporary C-RNTI, or CS-RNTI, the MAC entity shall for each PDCCH occasion and for each Serving Cell belonging to a TAG that has a running timeAlignmentTimer and for each grant received for this PDCCH occasion:

1> if an uplink grant for this Serving Cell has been received on the PDCCH for the MAC entity's C-RNTI or Temporary C-RNTI; or
1> if an uplink grant has been received in a Random Access Response:
   2> if the uplink grant is for MAC entity's C-RNTI and if the previous uplink grant delivered to the HARQ entity for the same HARQ process was either an uplink grant received for the MAC entity's CS-RNTI or a configured uplink grant:
      3> consider the NDI to have been toggled for the corresponding HARQ process regardless of the value of the NDI.
   2> if the uplink grant is for MAC entity's C-RNTI, and the identified HARQ process is configured for a configured uplink grant:
      3> start or restart the configuredGrantTimer for the corresponding HARQ process, if configured.
   2> deliver the uplink grant and the associated HARQ information to the HARQ entity.
1> else if an uplink grant for this PDCCH occasion has been received for this Serving Cell on the PDCCH for the MAC entity's CS-RNTI:
   2> if the NDI in the received HARQ information is 1:
      3> consider the NDI for the corresponding HARQ process not to have been toggled;
      3> start or restart the configuredGrantTimer for the corresponding HARQ process, if configured;
      3> deliver the uplink grant and the associated HARQ information to the HARQ entity.
   2> else if the NDI in the received HARQ information is 0:
      3> if PDCCH contents indicate configured grant Type 2 deactivation:
         4> trigger configured uplink grant confirmation.
      3> else if PDCCH contents indicate configured grant Type 2 activation:
         4> trigger configured uplink grant confirmation;
         4> store the uplink grant for this Serving Cell and the associated HARQ information as configured uplink grant;
         4> initialise or re-initialise the configured uplink grant for this Serving Cell to start in the associated PUSCH duration and to recur according to rules in clause 5.8.2;
         4> stop the configuredGrantTimer for the corresponding HARQ process, if running;

For each Serving Cell and each configured uplink grant, if configured and activated, the MAC entity shall:

1> if the PUSCH duration of the configured uplink grant does not overlap with the PUSCH duration of an uplink grant received on the PDCCH or in a Random Access Response for this Serving Cell:
   2> set the HARQ Process ID to the HARQ Process ID associated with this PUSCH duration;
   2> if the configuredGrantTimer for the corresponding HARQ process is not running:
      3> consider the NDI bit for the corresponding HARQ process to have been toggled;
      3> deliver the configured uplink grant and the associated HARQ information to the HARQ entity.

For configured uplink grants, the HARQ Process ID associated with the first symbol of a UL transmission is derived from the following equation:

$$\text{HARQ Process ID} = [\text{floor}(\text{CURRENT\_symbol}/\text{periodicity})] \bmod \text{nrofHARQ-Processes}$$

where CURRENT_symbol=(SFN×numberOfSlotsPerFrame×numberOfSymbolsPerSlot+slot number in the frame×numberOfSymbolsPerSlot+symbol number in the slot), and numberOfSlotsPerFrame and numberOfSymbolsPerSlot refer to the number of consecutive slots per frame and the number of consecutive symbols per slot, respectively as specified in TS 38.211 [8].

5.4.2 HARQ Operation 5.4.2.1 HARQ Entity

The MAC entity includes a HARQ entity for each Serving Cell with configured uplink (including the case when it is configured with supplementaryUplink), which maintains a number of parallel HARQ processes.

The number of parallel UL HARQ processes per HARQ entity is specified in TS 38.214 [7].

Each HARQ process supports one TB.

Each HARQ process is associated with a HARQ process identifier. For UL transmission with UL grant in RA Response, HARQ process identifier 0 is used.

When the MAC entity is configured with pusch-AggregationFactor>1, the parameter pusch-AggregationFactor provides the number of transmissions of a TB within a bundle of the dynamic grant. After the initial transmission, pusch-AggregationFactor−1 HARQ retransmissions follow within a bundle. When the MAC entity is configured with repK>1, the parameter repK provides the number of transmissions of a TB within a bundle of the configured uplink grant. After the initial transmission, HARQ retransmissions follow within a bundle. For both dynamic grant and configured uplink grant, bundling operation relies on the HARQ entity for invoking the same HARQ process for each transmission that is part of the same bundle. Within a bundle, HARQ retransmissions are triggered without waiting for feedback from previous transmission according to pusch-AggregationFactor for a dynamic grant and repK for a configured uplink grant, respectively. Each transmission within a bundle is a separate uplink grant after the initial uplink grant within a bundle is delivered to the HARQ entity.

For each transmission within a bundle of the dynamic grant, the sequence of redundancy versions is determined according to clause 6.1.2.1 of TS 38.214 [7]. For each transmission within a bundle of the configured uplink grant, the sequence of redundancy versions is determined according to clause 6.1.2.3 of TS 38.214 [7].

For each uplink grant, the HARQ entity shall:

1> identify the HARQ process associated with this grant, and for each identified HARQ process:
  2> if the received grant was not addressed to a Temporary C-RNTI on PDCCH, and the NDI provided in the associated HARQ information has been toggled compared to the value in the previous transmission of this TB of this HARQ process; or
  2> if the uplink grant was received on PDCCH for the C-RNTI and the HARQ buffer of the identified process is empty; or
  2> if the uplink grant was received in a Random Access Response; or
  2> if the uplink grant was received on PDCCH for the C-RNTI in ra-ResponseWindow and this PDCCH successfully completed the Random Access procedure initiated for beam failure recovery; or
  2> if the uplink grant is part of a bundle of the configured uplink grant, and may be used for initial transmission according to clause 6.1.2.3 of TS 38.214 [7], and if no MAC PDU has been obtained for this bundle:
    3> if there is a MAC PDU in the Msg3 buffer and the uplink grant was received in a Random Access Response; or:
    3> if there is a MAC PDU in the Msg3 buffer and the uplink grant was received on PDCCH for the C-RNTI in ra-ResponseWindow and this PDCCH successfully completed the Random Access procedure initiated for beam failure recovery:
      4> obtain the MAC PDU to transmit from the Msg3 buffer.
      4> if the uplink grant size does not match with size of the obtained MAC PDU; and
      4> if the Random Access procedure was successfully completed upon receiving the uplink grant:
        5> indicate to the Multiplexing and assembly entity to include MAC subPDU(s) carrying MAC SDU from the obtained MAC PDU in the subsequent uplink transmission;
        5> obtain the MAC PDU to transmit from the Multiplexing and assembly entity.
    3> else:
      4> obtain the MAC PDU to transmit from the Multiplexing and assembly entity, if any;
    3> if a MAC PDU to transmit has been obtained:
      4> deliver the MAC PDU and the uplink grant and the HARQ information of the TB to the identified HARQ process;
      4> instruct the identified HARQ process to trigger a new transmission;
      4> if the uplink grant is addressed to CS-RNTI; or
      4> if the uplink grant is a configured uplink grant; or
      4> if the uplink grant is addressed to C-RNTI, and the identified HARQ process is configured for a configured uplink grant:
        5> start or restart the configuredGrant Timer, if configured, for the corresponding HARQ process when the transmission is performed.
    3> else:
      4> flush the HARQ buffer of the identified HARQ process.
  2> else (i.e. retransmission):
    3> if the uplink grant received on PDCCH was addressed to CS-RNTI and if the HARQ buffer of the identified process is empty; or
    3> if the uplink grant is part of a bundle and if no MAC PDU has been obtained for this bundle; or
    3> if the uplink grant is part of a bundle of the configured uplink grant, and the PUSCH duration of the uplink grant overlaps with a PUSCH duration of another uplink grant received on the PDCCH or in a Random Access Response for this Serving Cell:
      4> ignore the uplink grant.
    3> else:
      4> deliver the uplink grant and the HARQ information (redundancy version) of the TB to the identified HARQ process;
      4> instruct the identified HARQ process to trigger a retransmission;
      4> if the uplink grant is addressed to CS-RNTI; or
      4> if the uplink grant is addressed to C-RNTI, and the identified HARQ process is configured for a configured uplink grant:
        5> start or restart the configuredGrant Timer, if configured, for the corresponding HARQ process when the transmission is performed.

When determining if NDI has been toggled compared to the value in the previous transmission the MAC entity shall ignore NDI received in all uplink grants on PDCCH for its Temporary C-RNTI.

5.4.2.2 HARQ Process

Each HARQ process is associated with a HARQ buffer.

New transmissions are performed on the resource and with the MCS indicated on either PDCCH, Random Access Response, or RRC. Retransmissions are performed on the resource and, if provided, with the MCS indicated on PDCCH, or on the same resource and with the same MCS as was used for last made transmission attempt within a bundle.

If the HARQ entity requests a new transmission for a TB, the HARQ process shall:
1> store the MAC PDU in the associated HARQ buffer;
1> store the uplink grant received from the HARQ entity;
1> generate a transmission as described below.

If the HARQ entity requests a retransmission for a TB, the HARQ process shall:
1> store the uplink grant received from the HARQ entity;
1> generate a transmission as described below.

To generate a transmission for a TB, the HARQ process shall:

1> if the MAC PDU was obtained from the Msg3 buffer; or
1> if there is no measurement gap at the time of the transmission and, in case of retransmission, the retransmission does not collide with a transmission for a MAC PDU obtained from the Msg3 buffer:
  2> instruct the physical layer to generate a transmission according to the stored uplink grant.

Scheduling Request (SR) is introduced in 3GPP TS 38.321 as follows:

5.4.4 Scheduling Request

The Scheduling Request (SR) is used for requesting UL-SCH resources for new transmission.

The MAC entity may be configured with zero, one, or more SR configurations. An SR configuration consists of a set of PUCCH resources for SR across different BWPs and cells. For a logical channel, at most one PUCCH resource for SR is configured per BWP.

Each SR configuration corresponds to one or more logical channels. Each logical channel may be mapped to zero or one SR configuration, which is configured by RRC. The SR configuration of the logical channel that triggered the BSR (clause 5.4.5) (if such a configuration exists) is considered as corresponding SR configuration for the triggered SR.

RRC configures the following parameters for the scheduling request procedure:
  sr-ProhibitTimer (per SR configuration);
  sr-TransMax (per SR configuration).

The following UE variables are used for the scheduling request procedure:
  SR_COUNTER (per SR configuration).

If an SR is triggered and there are no other SRs pending corresponding to the same SR configuration, the MAC entity shall set the SR_COUNTER of the corresponding SR configuration to 0.

When an SR is triggered, it shall be considered as pending until it is cancelled. All pending SR(s) triggered prior to the MAC PDU assembly shall be cancelled and each respective sr-ProhibitTimer shall be stopped when the MAC PDU is transmitted and this PDU includes a Long or Short BSR MAC CE which contains buffer status up to (and including) the last event that triggered a BSR (see clause 5.4.5) prior to the MAC PDU assembly. All pending SR(s) shall be cancelled and each respective sr-ProhibitTimer shall be stopped when the UL grant(s) can accommodate all pending data available for transmission.

Only PUCCH resources on a BWP which is active at the time of SR transmission occasion are considered valid.

As long as at least one SR is pending, the MAC entity shall for each pending SR:

1> if the MAC entity has no valid PUCCH resource configured for the pending SR:
  2> initiate a Random Access procedure (see clause 5.1) on the SpCell and cancel the pending SR.
1> else, for the SR configuration corresponding to the pending SR:
  2> when the MAC entity has an SR transmission occasion on the valid PUCCH resource for SR configured; and
  2> if sr-ProhibitTimer is not running at the time of the SR transmission occasion; and
  2> if the PUCCH resource for the SR transmission occasion does not overlap with a measurement gap; and
  2> if the PUCCH resource for the SR transmission occasion does not overlap with a UL-SCH resource:
    3> if SR_COUNTER<sr-TransMax:
      4> increment SR_COUNTER by 1;
      4> instruct the physical layer to signal the SR on one valid PUCCH resource for SR;
      4> start the sr-ProhibitTimer.
    3> else:
      4> notify RRC to release PUCCH for all Serving Cells;
      4> notify RRC to release SRS for all Serving Cells;
      4> clear any configured downlink assignments and uplink grants;
      4> clear any PUSCH resources for semi-persistent CSI reporting;
      4> initiate a Random Access procedure (see clause 5.1) on the SpCell and cancel all pending SRs.

NOTE 1: The selection of which valid PUCCH resource for SR to signal SR on when the MAC entity has more than one overlapping valid PUCCH resource for the SR transmission occasion is left to UE implementation.

NOTE 2: If more than one individual SR triggers an instruction from the MAC entity to the PHY layer to signal the SR on the same valid PUCCH resource, the SR_COUNTER for the relevant SR configuration is incremented only once.

The MAC entity may stop, if any, ongoing Random Access procedure due to a pending SR which has no valid PUCCH resources configured, which was initiated by MAC entity prior to the MAC PDU assembly. Such a Random Access procedure may be stopped when the MAC PDU is transmitted using a UL grant other than a UL grant provided by Random Access Response, and this PDU includes a BSR MAC CE which contains buffer status up to (and including) the last event that triggered a BSR (see clause 5.4.5) prior to the MAC PDU assembly, or when the UL grant(s) can accommodate all pending data available for transmission.

Activation/Deactivation of SCells and SCell removal in response to reconfiguration of MAC entity are introduced in 3GPP TS 38.321 as follows:

5.9 Activation/Deactivation of SCells

If the MAC entity is configured with one or more SCells, the network may activate and deactivate the configured SCells. Upon configuration of an SCell, the SCell is deactivated.

The configured SCell(s) is activated and deactivated by:
  receiving the SCell Activation/Deactivation MAC CE described in clause 6.1.3.10;
  configuring sCellDeactivationTimer timer per configured SCell (except the SCell configured with PUCCH, if any): the associated SCell is deactivated upon its expiry.

The MAC entity shall for each configured SCell:
1> if an SCell Activation/Deactivation MAC CE is received activating the SCell:
  2> activate the SCell according to the timing defined in TS 38.213 [6]; i.e. apply normal SCell operation including:
    3> SRS transmissions on the SCell;
    3> CSI reporting for the SCell;
    3> PDCCH monitoring on the SCell;
    3> PDCCH monitoring for the SCell;
    3> PUCCH transmissions on the SCell, if configured.
  2> if the SCell was deactivated prior to receiving this SCell Activation/Deactivation MAC CE:

3> activate the DL BWP and UL BWP indicated by firstActiveDownlinkBWP-Id and firstActiveUplinkBWP-Id respectively;
2> start or restart the sCellDeactivationTimer associated with the SCell according to the timing defined in TS 38.213 [6];
2> (re-)initialize any suspended configured uplink grants of configured grant Type 1 associated with this SCell according to the stored configuration, if any, and to start in the symbol according to rules in clause 5.8.2;
2> trigger PHR according to clause 5.4.6.
1> else if an SCell Activation/Deactivation MAC CE is received deactivating the SCell; or
1> if the sCellDeactivationTimer associated with the activated SCell expires:
2> deactivate the SCell according to the timing defined in TS 38.213 [6];
2> stop the sCellDeactivationTimer associated with the SCell;
2> stop the bwp-InactivityTimer associated with the SCell;
2> deactivate any active BWP associated with the SCell;
2> clear any configured downlink assignment and any configured uplink grant Type 2 associated with the SCell respectively;
2> clear any PUSCH resource for semi-persistent CSI reporting associated with the SCell;
2> suspend any configured uplink grant Type 1 associated with the SCell;
2> flush all HARQ buffers associated with the SCell.
1> if PDCCH on the activated SCell indicates an uplink grant or downlink assignment; or
1> if PDCCH on the Serving Cell scheduling the activated SCell indicates an uplink grant or a downlink assignment for the activated SCell; or
1> if a MAC PDU is transmitted in a configured uplink grant or received in a configured downlink assignment:
2> restart the sCellDeactivationTimer associated with the SCell.
1> if the SCell is deactivated:
2> not transmit SRS on the SCell;
2> not report CSI for the SCell;
2> not transmit on UL-SCH on the SCell;
2> not transmit on RACH on the SCell;
2> not monitor the PDCCH on the SCell;
2> not monitor the PDCCH for the SCell;
2> not transmit PUCCH on the SCell.

HARQ feedback for the MAC PDU containing SCell Activation/Deactivation MAC CE shall not be impacted by PCell, PSCell and PUCCH SCell interruptions due to SCell activation/deactivation in TS 38.133 [11].

When SCell is deactivated, the ongoing Random Access procedure on the SCell, if any, is aborted.

MAC reset is introduced in [1]:

5.12 MAC Reset

If a reset of the MAC entity is requested by upper layers, the MAC entity shall:
1> initialize Bj for each logical channel to zero;
1> stop (if running) all timers;
1> consider all timeAlignmentTimers as expired and perform the corresponding actions in clause 5.2;
1> set the NDIs for all uplink HARQ processes to the value 0;
1> stop, if any, ongoing RACH procedure;
1> discard explicitly signalled contention-free Random Access Resources, if any;
1> flush Msg3 buffer;
1> cancel, if any, triggered Scheduling Request procedure;
1> cancel, if any, triggered Buffer Status Reporting procedure;
1> cancel, if any, triggered Power Headroom Reporting procedure;
1> flush the soft buffers for all DL HARQ processes;
1> for each DL HARQ process, consider the next received transmission for a TB as the very first transmission;
1> release, if any, Temporary C-RNTI;
1> reset BFI_COUNTER.

5.11 MAC Reconfiguration

When a reconfiguration of the MAC entity is requested by upper layers, the MAC entity shall:
1> initialize the corresponding HARQ entity upon addition of an SCell;
1> remove the corresponding HARQ entity upon removal of an SCell;
1> apply the new value for timers when the timer is (re)started;
1> apply the new maximum parameter value when counters are initialized;
1> apply immediately the configurations received from upper layers for other parameters.

In 3GPP R2-1915254 (which is the Change Request for 3GPP TS 38.321), procedure for beam failure procedure for Secondary Cell is introduced as follows:

5.17 Beam Failure Detection and Recovery Procedure

The MAC entity may be configured by RRC per Serving Cell with a beam failure recovery procedure which is used for indicating to the serving gNB of a new SSB or CSI-RS when beam failure is detected on the serving SSB(s)/CSI-RS(s). Beam failure is detected by counting beam failure instance indication from the lower layers to the MAC entity. If beamFailureRecoveryConfig is reconfigured by upper layers during an ongoing Random Access procedure for beam failure recovery for SpCell, the MAC entity shall stop the ongoing Random Access procedure and initiate a Random Access procedure using the new configuration.

RRC configures the following parameters in the BeamFailureRecoveryConfig and the RadioLinkMonitoringConfig for the Beam Failure Detection and Recovery procedure:
beamFailureInstanceMaxCount for the beam failure detection;
beamFailureDetectionTimer for the beam failure detection;
beamFailureRecoveryTimer for the beam failure recovery procedure;
rsrp-ThresholdSSB: an RSRP threshold for the beam failure recovery;
powerRampingStep: powerRampingStep for the beam failure recovery;
powerRampingStepHighPriority: powerRampingStepHighPriority for the beam failure recovery;
preambleReceivedTargetPower: preambleReceivedTargetPower for the beam failure recovery;
preambleTransMax: preambleTransMax for the beam failure recovery;
scalingFactorBI: scalingFactorBI for the beam failure recovery;
ssb-perRACH-Occasion: ssb-perRACH-Occasion for the beam failure recovery;

ra-Response Window: the time window to monitor response(s) for the beam failure recovery using contention-free Random Access Preamble;
prach-ConfigurationIndex: prach-ConfigurationIndex for the beam failure recovery;
ra-ssb-OccasionMaskIndex: ra-ssb-OccasionMaskIndex for the beam failure recovery;
ra-OccasionList: ra-OccasionList for the beam failure recovery.
Editors Note: The specific parameters for SCell BFR will be replicated here after they are settled.
The following UE variables are used for the beam failure detection procedure:
BFI_COUNTER: counter for beam failure instance indication which is initially set to 0.
The MAC entity shall for each Serving Cell configured for beam failure detection:
1> if beam failure instance indication has been received from lower layers:
2> start or restart the beamFailureDetectionTimer;
2> increment BFI_COUNTER by 1;
2> if BFI_COUNTER>=beamFailureInstanceMaxCount:
3> if the Serving Cell is SCell:
4> trigger BFR;
3> else:
4> initiate a Random Access procedure (see clause 5.1) on the SpCell.
1> if the beamFailureDetectionTimer expires; or
1> if beamFailureDetectionTimer, beamFailureInstanceMaxCount, or any of the reference signals used for beam failure detection is reconfigured by upper layers associated with this Serving Cell:
2> set BFI_COUNTER to 0.
1> if the Serving Cell is SpCell and the Random Access procedure is successfully completed (see clause 5.1):
2> set BFI_COUNTER to 0;
2> stop the beamFailureRecoveryTimer, if configured;
2> consider the Beam Failure Recovery procedure successfully completed.
1> else if the Serving Cell is SCell; and
1> if a PDCCH addressed to C-RNTI indicating uplink grant for a new transmission is received for the HARQ process used for the SCell BFR MAC CE transmission indicating this Serving Cell:
2> set BFI_COUNTER to 0;
2> consider the Beam Failure Recovery procedure successfully completed and cancel all the triggered BFRs for this Serving Cell.
The MAC entity shall:
1> if the Beam Failure Recovery procedure determines that at least one BFR has been triggered and not cancelled:
2> if UL-SCH resources are available for a new transmission and the UL-SCH resources can accommodate the SCell BFR MAC CE plus its subheader as a result of logical channel prioritization:
3> instruct the Multiplexing and Assembly procedure to generate the SCell BFR MAC CE.
2> else:
3> trigger a Scheduling Request for SCell beam failure recovery.
6.1.3.XX SCell BFR MAC CE
The SCell BFR MAC CE is identified by a MAC subheader with LCID as specified in Table 6.2.1-2. It has variable size and consists of the following fields:
Editors Note: Exact fields and format are FFS.
When the SCell BFR MAC CE is to be generated, the MAC entity shall for each Serving Cell to be reported in this SCell BFR MAC CE:

1> if at least one of the SSBs with SS-RSRP above [rsrp-ThresholdSSB] amongst the SSBs in [candidate-BeamRSList] or the CSI-RSs with CSI-RSRP above [rsrp-ThresholdCSI-RS] amongst the CSI-RSs in [candidateBeamRSList] is available:
2> select an SSB with SS-RSRP above [rsrp-ThresholdSSB] amongst the SSBs in [candidate-BeamRSList] or a CSI-RS with CSI-RSRP above [rsrp-ThresholdCSI-RS] amongst the CSI-RSs in [candidateBeamRSList];
2> set the [new candidate RS field name] to 1 and set the [new candidate RS index field name] corresponding to the selected SSB or CSI-RS in the SCell BFR MAC CE.
1> else:
2> set the [new candidate RS field name] to 0 in the SCell BFR MAC CE.
Editors Note: The highlighted field names will be changed to the ones defined for the purpose.
In the 3GPP RAN2 #107bis meeting (as captured in the 3GPP RAN2 #107bis meeting report), agreements have been made associated with BFR procedure for SCell as follows:

Agreements:

1. The Scell beam failure detection is per cell.
2. Each DL BWP of a SCell can be configured with an independent SCell BFR configuration (the content is FFS)
3. One SR ID is configured for BFR within the same cell group.
4. The SCell BFRQ MAC CE triggers a SCell BFRQ SR if there is no valid uplink grant which can accommodate the SCell BFRQ MAC CE.
5. FFS whether the transmission of the SCell BFRQ MAC CE cancels the pending BFRQ SR of the failed SCell(s).(depends whether the MAC CE provides info for one or more Scells)
6. When the number of the BFRQ SR transmission reaches the sr-TransMax, the UE triggers a RACH procedure (i.e. reuse Rel-15 behaviour)

In 3GPP RAN1 #98 meeting (as discussed in 3GPP R1-1909833), the following discussion related to the BFR procedure is provided:
Q1: Can the UE transmit BFR MAC CE using UL grant of any serving cell or should there be a restriction not to send it on failed serving cell(s)?
R1: At least from RAN1 perspective, there is no need for introducing such restrictions on MAC CE transmission for BFR in Rel-16.
Q2: If the UE already has the UL grant on serving cell(s) on which BFR MAC CE can be transmitted based on the answer to question 1, is the UE still required to transmit SR-like indication for BFR?
R2: In this case, UE is not required to transmit SR-like indication for SCell BFR.
Q3: Is there a case where the SR-like dedicated PUCCH resource for SCell BFR is not configured? If the SR-like dedicated PUCCH resource is not configured, one possible option being considered by RAN2 is that the UE follows the existing framework for requesting uplink resources when no uplink resources are available (i.e. performs CBRA on SpCell).
R3: RAN1 did not discuss this case. RAN1 plans to conclude on this by RAN1 #98bis.
Q4: Is the SR-like dedicated PUCCH resource for SCell BFR configured for each SCell separately or is it common for all SCell(s) of the same cell group (i.e. MCG/SCG)?

R4: The SR-like dedicated PUCCH resource for SCell BFR is not configured separately for each SCell.

Q5: What conditions are used for the (successful) completion of the SCell BFR?

R5: When UE receives beam failure recovery response (BFRR) to step 2, UE can consider BFR procedure is finished, where the BFRR to step 2 is a normal uplink grant to schedule a new transmission for the same HARQ process as PUSCH carrying the step 2 MAC CE, which is the same as normal "ACK" for PUSCH.

In 3GPP RAN2 #108 meeting (as captured in the 3GPP RAN2 #108 meeting report), the following agreements have been made associated with BFR procedure for SCell:

---

Agreements:

1. beamFailureDetectionTimer and beamFailureInstanceMaxCount are configured cell specifically per each DL BWP configured.
2. Upon reconfiguration of beamFailureDetectionTimer, beamFailureInstanceMaxCount, or any of the reference signals used for beam failure detection by upper layers, BFI_COUNTER is set to 0 for the given Serving Cell.
3. When SCell BFR SR resource is not configured and SCell BFR MAC CE transmission triggers SCell BFR SR, Random Access procedure on SpCell is triggered to request UL resources to transmit the SCell BFR MAC CE (similarly to Rel-15 behaviour on SR).
4. when SCell BFR SR is triggered and the UE has an overlapping SR PUCCH resource with the SCell BFR SR PUCCH resource, the UE shall select the SCell BFR SR PUCCH resource for transmission.
5. Pending SR for SCell beam failure recovery triggered prior to the MAC PDU assembly shall be cancelled when the MAC PDU is transmitted and this PDU includes a SCell BFR MAC CE.
6. SCell BFR MAC CE can carry information of multiple failed SCells, ie., multiple entry format for SCell BFR MAC CE is defined.
7. For each SCell, the SCell BFR MAC CE indicates the following information:
   - information about the failed SCell index;
   - indication if a new candidate beam RS is detected or not;
   - new candidate beam RS index (if available).
8. SCell BFR MAC CE has higher priority at least than "data from any Logical Channel, except data from UL-CCCH" and LBT, MAC CE higher priority is FFS.

---

In 3GPP TS 38.331 [6], procedures involving deactivating and/or releasing cells (e.g. RRC reconfiguration, reconfiguration with sync, Radio Resource Control (RRC) connection reestablishment and RRC connection release) are introduced as follows:

5.3.5 RRC Reconfiguration 5.3.5.5 Cell Group Configuration 5.3.5.5.1 General

The network configures the UE with Master Cell Group (MCG), and zero or one Secondary Cell Group (SCG). In (NG)EN-DC, the MCG is configured as specified in TS 36.331 [10], and for NE-DC, the SCG is configured as specified in TS 36.331 [10]. The network provides the configuration parameters for a cell group in the CellGroupConfig IE.

The UE performs the following actions based on a received CellGroupConfig IE:

1> if the CellGroupConfig contains the spCellConfig with reconfigurationWithSync:
  2> perform Reconfiguration with sync according to 5.3.5.5.2;
  2> resume all suspended radio bearers and resume SCG transmission for all radio bearers, if suspended;
1> if the CellGroupConfig contains the rlc-BearerToReleaseList:
  2> perform RLC bearer release as specified in 5.3.5.5.3;
1> if the CellGroupConfig contains the rlc-BearerToAddModList:
  2> perform the RLC bearer addition/modification as specified in 5.3.5.5.4;
1> if the CellGroupConfig contains the mac-CellGroupConfig:
  2> configure the MAC entity of this cell group as specified in 5.3.5.5.5;
1> if the CellGroupConfig contains the sCellToReleaseList:
  2> perform SCell release as specified in 5.3.5.5.8;
1> if the CellGroupConfig contains the spCellConfig:
  2> configure the SpCell as specified in 5.3.5.5.7;
1> if the CellGroupConfig contains the sCellToAddModList:
  2> perform SCell addition/modification as specified in 5.3.5.5.9.

5.3.5.5.2 Reconfiguration with Sync

The UE shall perform the following actions to execute a reconfiguration with sync.

1> if the AS security is not activated, perform the actions upon going to RRC_IDLE as specified in 5.3.11 with the release cause 'other' upon which the procedure ends;
1> stop timer T310 for the corresponding SpCell, if running;
1> start timer T304 for the corresponding SpCell with the timer value set to t304, as included in the reconfigurationWithSync;
1> if the frequencyInfoDL is included:
  2> consider the target SpCell to be one on the SSB frequency indicated by the frequencyInfoDL with a physical cell identity indicated by the physCellId;
1> else:
  2> consider the target SpCell to be one on the SSB frequency of the source SpCell with a physical cell identity indicated by the physCellId;
1> start synchronising to the DL of the target SpCell;
1> apply the specified BCCH configuration defined in 9.1.1.1;
1> acquire the MIB, which is scheduled as specified in TS 38.213 [13];

NOTE 1: The UE should perform the reconfiguration with sync as soon as possible following the reception of the RRC message triggering the reconfiguration with sync, which could be before confirming successful reception (HARQ and ARQ) of this message.

NOTE 2: The UE may omit reading the MIB if the UE already has the required timing information, or the timing information is not needed for random access.

1> reset the MAC entity of this cell group;
1> consider the SCell(s) of this cell group, if configured, to be in deactivated state;
1> apply the value of the newUE-Identity as the C-RNTI for this cell group;
1> configure lower layers in accordance with the received spCellConfigCommon;
1> configure lower layers in accordance with any additional fields, not covered in the previous, if included in the received reconfigurationWithSync.

5.3.5.5.8 SCell Release

The UE shall:

1> if the release is triggered by reception of the sCell-ToReleaseList:
   2> for each sCellIndex value included in the sCell-ToReleaseList:
      3> if the current UE configuration includes an SCell with value sCellIndex:
         4> release the SCell.

5.3.7 RRC Connection Re-Establishment

The purpose of this procedure is to re-establish the RRC connection. A UE in RRC_CONNECTED, for which AS security has been activated with SRB2 and at least one DRB setup, may initiate the procedure in order to continue the RRC connection. The connection re-establishment succeeds if the network is able to find and verify a valid UE context or, if the UE context cannot be retrieved, and the network responds with an RRCSetup according to clause 5.3.3.4.

The network applies the procedure e.g. as follows:
When AS security has been activated and the network retrieves or verifies the UE context:
to re-activate AS security without changing algorithms;
to re-establish and resume the SRB1;
When UE is re-establishing an RRC connection, and the network is not able to retrieve or verify the UE context:
to discard the stored AS Context and release all RBs;
to fallback to establish a new RRC connection.

If AS security has not been activated, the UE shall not initiate the procedure but instead moves to RRC_IDLE directly, with release cause 'other'. If AS security has been activated, but SRB2 and at least one DRB are not setup, the UE does not initiate the procedure but instead moves to RRC_IDLE directly, with release cause 'RRC connection failure'.

5.3.7.2 Initiation

The UE initiates the procedure when one of the following conditions is met:

1> upon detecting radio link failure of the MCG, in accordance with 5.3.10; or
1> upon re-configuration with sync failure of the MCG, in accordance with sub-clause 5.3.5.8.3; or
1> upon mobility from NR failure, in accordance with sub-clause 5.4.3.5; or
1> upon integrity check failure indication from lower layers concerning SRB1 or SRB2, except if the integrity check failure is detected on the RRCReestablishment message; or
1> upon an RRC connection reconfiguration failure, in accordance with sub-clause 5.3.5.8.2.

Upon initiation of the procedure, the UE shall:

1> stop timer T310, if running;
1> stop timer T304, if running;
1> start timer T311;
1> suspend all RBs, except SRB0;
1> reset MAC;
1> release the MCG SCell(s), if configured;
1> release spCellConfig, if configured;
1> if MR-DC is configured:
   2> perform MR-DC release, as specified in clause 5.3.5.10;
   2> release p-NR-FR1, if configured;
   2> release p-UE-FR1, if configured;
1> release delayBudgetReportingConfig, if configured, and stop timer T342, if running;
1> release overheatingAssistanceConfig, if configured, and stop timer T345, if running;
1> perform cell selection in accordance with the cell selection process as specified in TS 38.304 [20], clause 5.2.6.

5.3.8 RRC Connection Release

5.3.8.3 Reception of the RRCRelease by the UE

The UE shall:

1> delay the following actions defined in this sub-clause 60 ms from the moment the RRCRelease message was received or optionally when lower layers indicate that the receipt of the RRCRelease message has been successfully acknowledged, whichever is earlier;
1> stop timer T380, if running;
1> stop timer T320, if running;
1> if the AS security is not activated:
   2> ignore any field included in RRCRelease message except waitTime;
   2> perform the actions upon going to RRC_IDLE as specified in 5.3.11 with the release cause 'other' upon which the procedure ends;
1> if the RRCRelease message includes redirectedCarrierInfo indicating redirection to eutra:
   2> if cnType is included:
      3> after the cell selection, indicate the available CN Type(s) and the received cnType to upper layers;

NOTE: Handling the case if the E-UTRA cell selected after the redirection does not support the core network type specified by the cnType, is up to UE implementation.

1> if the RRCRelease message includes the cellReselectionPriorities:
   2> store the cell reselection priority information provided by the cellReselectionPriorities;
   2> if the t320 is included:
      3> start timer T320, with the timer value set according to the value of t320;
1> else:
   2> apply the cell reselection priority information broadcast in the system information;
1> if deprioritisationReq is included:
   2> start or restart timer T325 with the timer value set to the deprioritisationTimer signalled;
   2> store the deprioritisationReq until T325 expiry;
1> if the RRCRelease includes suspendConfig:
   2> apply the received suspendConfig;
   2> reset MAC and release the default MAC Cell Group configuration, if any;
   2> re-establish RLC entities for SRB1;
   2> if the RRCRelease message with suspendConfig was received in response to an RRCResumeRequest or an RRCResumeRequest1:
      3> stop the timer T319 if running;
      3> in the stored UE Inactive AS context:
         4> replace the $K_{gNB}$ and $K_{RRCint}$ keys with the current $K_{gNB}$ and $K_{RRCint}$ keys;
         4> replace the C-RNTI with the temporary C-RNTI in the cell the UE has received the RRCRelease message;
         4> replace the cellIdentity with the cellIdentity of the cell the UE has received the RRCRelease message;
         4> replace the physical cell identity with the physical cell identity of the cell the UE has received the RRCRelease message;
   2> else:
      3> store in the UE Inactive AS Context the current $K_{gNB}$ and $K_{RRCint}$ keys, the ROHC state, the C-RNTI used in the source PCell, the cellIdentity and the physical cell identity of the source PCell, and all other parameters configured except for the ones within ReconfigurationWithSync and servingCellConfigCommonSIB;
2> suspend all SRB(s) and DRB(s), except SRB0;
2> indicate PDCP suspend to lower layers of all DRBs;
2> if the t380 is included:
   3> start timer T380, with the timer value set to t380;
2> if the RRCRelease message is including the wait-Time:
   3> start timer T302 with the value set to the waitTime;
   3> inform upper layers that access barring is applicable for all access categories except categories '0' and '2';
2> if T390 is running:
   3> stop timer T390 for all access categories;
   3> perform the actions as specified in 5.3.14.4;
2> indicate the suspension of the RRC connection to upper layers;
2> enter RRC_INACTIVE and perform cell selection as specified in TS 38.304 [20];
1> else
   2> perform the actions upon going to RRC_IDLE as specified in 5.3.11, with the release cause 'other'.

In NR, beam failure recovery (BFR) and BFR procedure for Secondary cell (SCell) have been introduced. A UE could trigger a BFR in response to receiving a number of (consecutive) beam failure indication from lower layers (e.g. physical layer) of the UE. The UE could perform a BFR procedure in response to the beam failure indications from the lower layers. A BFR procedure for SCell could include transmitting a Scheduling Request (SR) to a base station for requesting UL resources for transmitting a Medium Access Control (MAC) control element (CE). The BFR procedure could include transmitting a MAC CE (e.g. BFR MAC CE) using a Hybrid Automatic Repeat Request (HARQ) process to the base station. The MAC CE could indicate candidate beam(s) associated with beam failure recovery. The MAC CE could indicate SCell(s) associated with triggered beam failure recovery or ongoing BFR procedure. The UE could consider the procedure finished when the base station schedules an uplink grant for new transmission for the same HARQ process used to transmit the MAC CE.

An issue could occur when a MAC entity associated with a cell is reset when the cell is associated with a triggered BFR or an ongoing BFR procedure. The triggered BFR may not be cancelled or the ongoing BFR procedure may not be finished when the MAC entity is reset.

Figure 5:
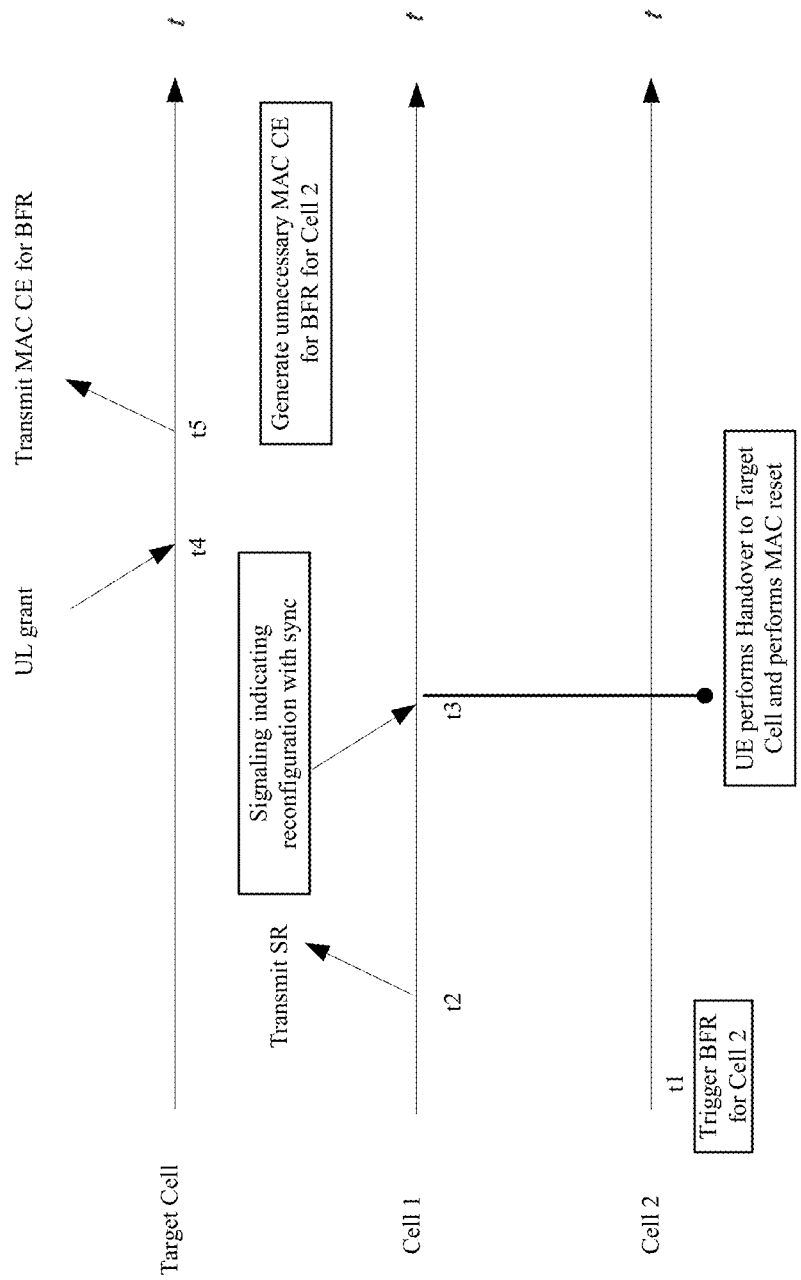
FIG. 5 is a diagram according to one exemplary embodiment.

An example is shown in FIG. 5. A UE is configured with two cells (e.g. Cell 1 and Cell 2) by a base station. Cell 1 could be a Primary Cell or a Secondary Cell. Cell 2 could be a Secondary Cell. The UE could trigger BFR associated with Cell 2 (e.g. in response to beam failure indication from lower layers of the UE) at a timing t1. The UE could perform a BFR procedure in response to the triggered BFR. The UE could transmit Scheduling Request at t2 in response to the triggered BFR on Cell 1. The UE could be configured with SR resources (e.g. PUCCH resources) on Cell 1 to the base station.

The base station could indicate an UL grant on the Cell 1 for new transmission in response to the SR at timing t4. The UE could use the UL grant to transmit a MAC CE using HARQ process (e.g. HARQ process 1) indicating BFR for Cell 2 at timing t5. The base station could indicate a second UL grant for new transmission for the HARQ process transmitting the MAC CE (e.g. HARQ process 1) to finish the BFR procedure. However, the base station could indicate the UE to perform procedures involving MAC reset (e.g. transmitting a signaling indicating reconfiguration with sync at t3). After performing MAC reset, the UE could consider time alignment timer as expired and may not perform UL transmission (e.g. PUCCH and PUSCH transmission). However, the triggered BFR for Cell 2 is not cancelled and is still pending after completion of reconfiguration with sync procedure.

After receiving the UL grant at t4, the UE could generate a BFR MAC CE for Cell 2 and transmit the MAC CE to the base station. The ongoing BFR procedure could incur unnecessary transmission overhead between the UE and the base station since BFR procedure is for recovery transmission between Cell 2 and UE and the procedure is unnecessary if Cell 2 is removed, deactivated, or not used according to procedures including MAC reset. The transmission of BFR MAC CE could be outdated and could cause unnecessary UL grant scheduled by the base station.

Another issue could occur when the cell associated with a triggered BFR or an ongoing BFR procedure is removed before the ongoing BFR procedure is finished or the triggered BFR is cancelled. The Cell could be removed in response to a MAC reconfiguration indicated by a network. An example is shown in FIG. 6.

Figure 6:
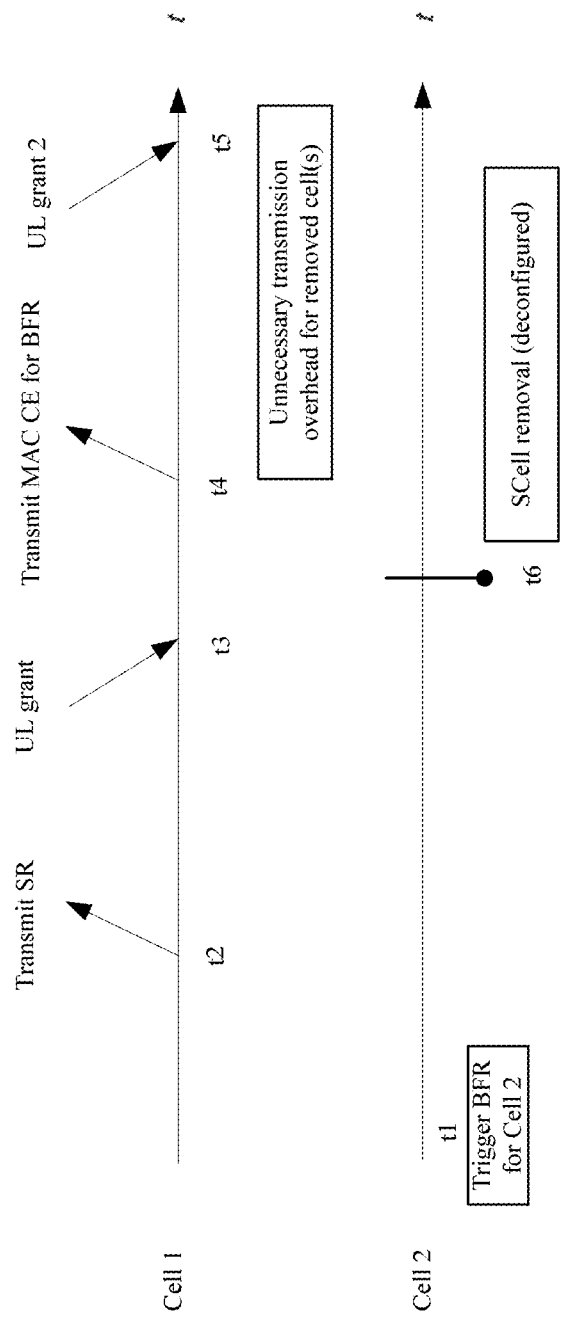
FIG. 6 is a diagram according to one exemplary embodiment.

As shown in FIG. 6, a UE is configured with two cells (e.g. cell 1 and cell 2) by a base station. Cell 1 could be a Primary Cell or a Secondary Cell. Cell 2 could be a Secondary Cell. The UE could trigger BFR associated with Cell 2 (e.g. in response to beam failure indication from lower layers of the UE) at a timing t1. The UE could perform a BFR procedure in response to the triggered BFR. The UE could transmit Scheduling Request at t2 in response to the triggered BFR on Cell 1. The UE could be configured with SR resources (e.g. PUCCH resources) on Cell 1 to the base station.

The base station could indicate an UL grant on the Cell 1 for new transmission in response to the SR at timing t3. The UE could use the UL grant to transmit a MAC CE using HARQ process (e.g. HARQ process 1) indicating BFR for Cell 2 at timing t4. The base station could indicate a second UL grant for new transmission for the HARQ process transmitting the MAC CE (e.g. HARQ process 1) to finish the BFR procedure. However, the base station could remove (or deconfigure) Cell 2 for the UE (e.g. in response to low transmission quality). The base station could remove or release a Cell for the UE via a MAC reconfiguration message. The MAC reconfiguration message could be a RRC signaling (e.g. RRC reconfiguration message). The ongoing BFR procedure could incur unnecessary transmission overhead between the UE and the base station since BFR procedure is for recovery transmission between Cell 2 and UE and the procedure is unnecessary if Cell 2 is removed or released. The transmission of BFR MAC CE could be outdated and could cause unnecessary UL grant scheduled by the base station. Moreover, if there is no SR configuration for BFR for Cell 2 configured for the UE, the UE could trigger a random access procedure in response to the triggered BFR, and the RA procedure could interfere connection establishment of other UEs to the base station.

To solve the issue(s) mentioned above, one general concept of the invention is that a UE could cancel (or stop) at least one triggered beam failure recovery (BFR) (e.g. triggered BFR) associated with a cell in response to a reset of a MAC entity corresponding to the cell. Additionally or alternatively, the UE could stop (or cancel or consider completion of) an ongoing BFR procedure associated with the cell in response to the reset of the MAC entity corresponding to the cell. The UE could stop the ongoing BFR procedure associated with the cell in response to the reset of the MAC entity corresponding to the cell if a BFR MAC CE generated in response to the ongoing BFR procedure contains only beam failure information of cells associated with the MAC entity. The UE may not stop the ongoing BFR procedure if the BFR MAC CE contains beam failure information of cells associated with MAC entities other than the MAC entity.

The BFR procedure could contain transmitting a Scheduling Request for (SCell) beam failure recovery (associated with the triggered BFR). The UE could trigger the Scheduling Request in response to the triggered BFR. Additionally or alternatively, the UE could stop transmitting the Scheduling Request for (SCell) beam failure recovery in response to the reset of the MAC entity. The reset of the MAC entity could be performed during a procedure.

Additionally or alternatively, the UE could stop (or cancel or consider completion of) the ongoing BFR procedure associated with the cell in response to receiving a RRC signaling from the base station. The RRC signaling could indicate the UE to perform a procedure involving reset of a MAC entity. The UE could cancel (or stop) the at least one triggered BFR associated with the cell in response to receiving the RRC signaling from the base station.

Additionally or alternatively, the UE could stop the ongoing BFR procedure associated with the cell in response to an initiation of a procedure. The procedure could involve reset of a MAC entity. The procedure could include reconfiguration with sync, RRC connection reestablishment, and/or RRC connection release.

Additionally or alternatively, the UE could cancel triggered Scheduling Request for (SCell) BFR associated with the cell in response to the reset of the MAC entity or in response to stopping of the BFR procedure. Additionally or alternatively, in response to the reset of the MAC entity or in response to stopping of the BFR procedure, the UE could stop (any ongoing) random access procedure initiated in response to SR or BFR triggered for the cell.

Additionally or alternatively, the UE could not transmit a BFR MAC CE that is generated before reset of the MAC entity. The BFR MAC CE could indicate beam failure information of the cell. Additionally or alternatively, the UE could discard a BFR MAC CE associated with the triggered BFR. Additionally or alternatively, the UE could rebuild a MAC PDU containing the BFR MAC CE to a new MAC PDU without the BFR MAC CE.

Additionally or alternatively, the UE may not discard the BFR MAC CE associated with the triggered BFR if the BFR MAC CE indicates beam failure of other cells not associated with the MAC entity (e.g. cells of other cell groups). Additionally or alternatively, the UE may not cancel triggered BFR not associated with the MAC entity.

Figure 7:
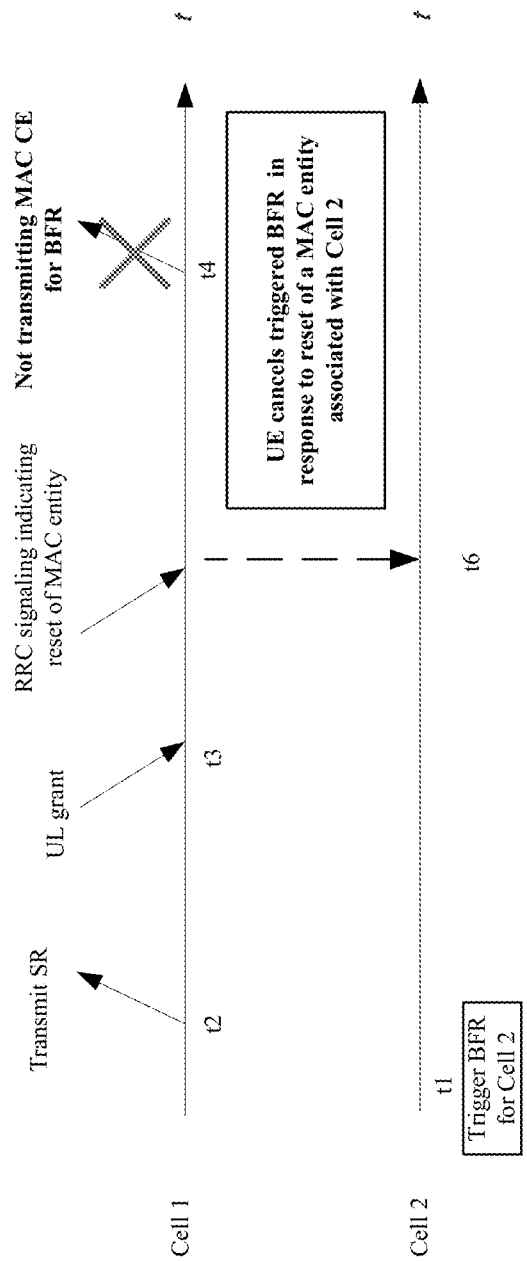
FIG. 7 is a diagram according to one exemplary embodiment.

An example is shown in FIG. 7. As shown in FIG. 7, a UE could be configured with 2 (activated) Serving Cells. A UE could trigger Beam failure recovery (BFR for SCell beam failure recovery) associated with Cell 2 at timing t1 (e.g. in response to beam failure indication from lower layers). The UE could perform a BFR procedure in response to triggered beam failure recovery. The UE could trigger a Scheduling Request in response to the triggered BFR. The UE could transmit a Scheduling request at t2 to a base station for requesting UL resources. The base station could indicate a UL grant at t3 via PDCCH. The UE could receive a RRC signaling indicating reset of a MAC entity at t6. In response to the reset of the MAC entity, the UE could cancel the triggered BFR and/or stops the ongoing BFR procedure. The UE may not (re)transmit a BFR MAC CE indicating beam failure of Cell 2 to the base station after the MAC reset.

Additionally or alternatively, the MAC entity could be reset before transmission of Scheduling Request (e.g. t6<t2 in time domain perspective). The UE may not transmit or retransmit SR associated with (the triggered) BFR of Cell 2 to the base station if the MAC entity is reset. Additionally or alternatively, the UE may not generate a BFR MAC CE in response to a triggered BFR if the MAC entity associated with Cell 2 is reset after the triggering of the BFR.

Another general concept of the invention is that a UE could cancel one or more triggered beam failure recovery (BFR) associated with a cell in response to a removal associated with the cell or in response to a removal of a HARQ entity corresponding to the cell. Additionally or alternatively, the UE could stop an ongoing BFR procedure associated with the cell in response to the removal associated with the cell or in response to a removal of the HARQ entity corresponding to the cell. The UE could stop the ongoing BFR procedure associated with the cell in response to the removal of the cell or in response to the removal of the HARQ entity corresponding to the cell if a BFR MAC CE generated in response to the ongoing BFR procedure contains only beam failure information of the cell.

Additionally or alternatively, the UE could stop the ongoing BFR procedure associated with the cell in response to the removal associated with the cell or in response to the removal of the HARQ entity corresponding to the cell if the UE does not have other (activate or activated) cells associated with a triggered or pending BFR. The UE could stop the ongoing BFR procedure if beam failure information indicated in a BFR MAC CE generated in response to the BFR procedure does not contain beam failure information of activating or activated (e.g. non-removed or configured) cells. The UE may not stop a (ongoing) BFR procedure if there is at least one activating or activated (e.g. non-removed or configured) cell associated with a triggered or pending BFR. The UE may not stop a (ongoing) BFR procedure if a BFR MAC CE generated in response to the BFR procedure contains beam failure information of at least one activating or activated (e.g. non-removed or configured) cell.

Additionally or alternatively, the UE could cancel triggered Scheduling Request for BFR associated with the cell in response to the removal associated with the cell or in response to stopping of the BFR procedure. Additionally or alternatively, in response to the removal associated with the cell or in response to stopping of the BFR procedure, the UE could stop (any ongoing) random access procedure initiated in response to SR or BFR triggered for the cell.

Additionally or alternatively, the UE may not transmit a BFR MAC CE that is generated before the removal associated with the cell. The BFR MAC CE could indicate beam failure information of the cell. Additionally or alternatively, the UE could discard a BFR MAC CE associated with the triggered BFR. Additionally or alternatively, the UE could rebuild a MAC PDU containing the BFR MAC CE to a new MAC PDU without the BFR MAC CE.

Additionally or alternatively, the UE may not discard the BFR MAC CE associated with the triggered BFR if the BFR MAC CE indicates beam failure of other cells not associated with a cell removal (e.g. activated cells). Additionally or alternatively, the UE may not cancel triggered BFR not associated with a removed cell. Additionally or alternatively, the UE may not stop an (ongoing) BFR procedure associated with cells other than the cell.

Additionally or alternatively, the UE may not cancel a triggered Scheduling Request for BFR in response to the removal associated with the cell if the removal associated with the cell does not remove all (activated) (Secondary) cell(s) for which BFR was triggered. Additionally or alternatively, the UE may not stop an ongoing random access procedure for BFR in response to the removal associated with the cell if the removal associated with the cell does not remove all (activated) (Secondary) cell(s) for which BFR was triggered.

Figure 8:
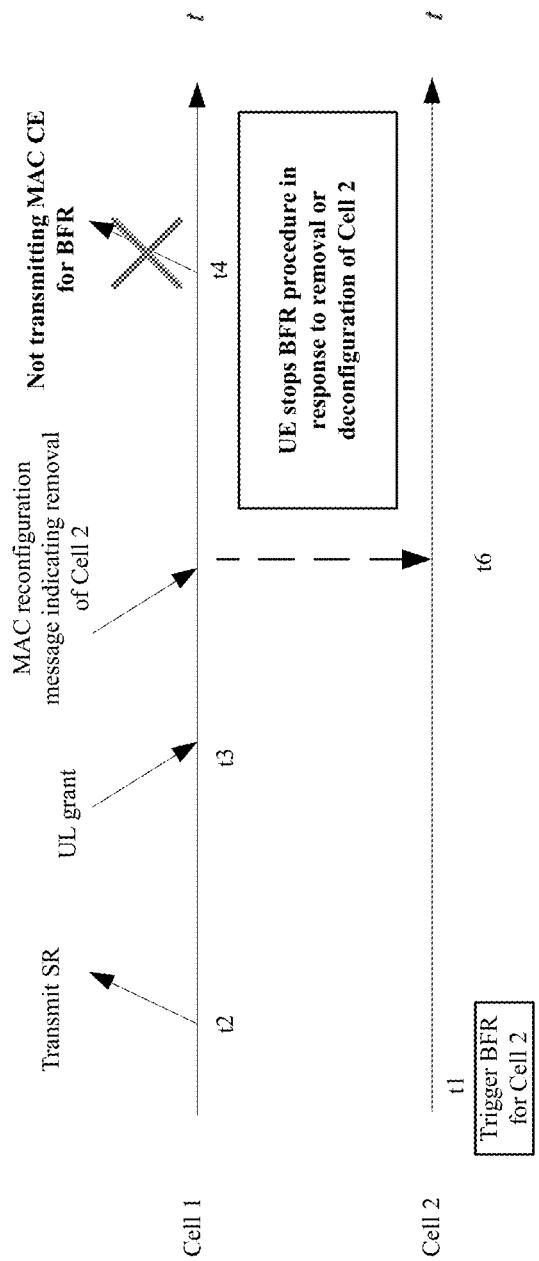
FIG. 8 is a diagram according to one exemplary embodiment.

An example is shown in FIG. 8. As shown in FIG. 8, a UE could be configured with 2 (activated) Serving Cells. A UE could trigger Beam failure recovery associated with Cell 2 at timing t1 (e.g. in response to beam failure indication from lower layers). The UE could perform a BFR procedure in response to triggered beam failure recovery. The UE could transmit a Scheduling request at t2 to a base station for requesting UL resources. The base station could indicate a UL grant at t3 via Physical Downlink Control Channel (PDCCH). Cell 2 could be removed or deconfigured (in response to MAC reconfiguration transmitted by the base station or in response to request by upper layers) at t6. In response to the removal of Cell 2, the UE could stop the BFR procedure. The UE may not (re)transmit a BFR MAC CE indicating beam failure of Cell 2 to the base station.

Additionally or alternatively, Cell 2 could be removed before transmission of Scheduling Request (e.g. t6<t2 in time domain perspective). The UE may not transmit or retransmit SR associated with BFR of Cell 2 to the base station if Cell 2 is removed. Additionally or alternatively, the UE may not generate a BFR MAC CE in response to a triggered BFR if Cell 2 is removed after the triggering of the BFR.

Another general concept of the invention is that when a BFR procedure is ongoing, a UE could trigger a BFR or generate a BFR MAC CE in response to removal of a cell. Additionally or alternatively, for a UE transmits a first BFR MAC CE associated with a triggered BFR for a cell, a UE could generate a second BFR MAC CE in response to removal associated with the cell. The second BFR MAC CE may not contain beam failure indication of the removed cell(s). The first MAC CE could contain beam failure information of more than one cell(s). The UE could cancel BFR triggered associated with the (removed) cell(s). The UE may not stop a BFR procedure associated with the removed cell(s) if the UE generate a BFR MAC CE in response to the BFR procedure and the BFR MAC CE contains beam failure information of other cells that are not removed. The UE may not generate the second BFR MAC CE if the BFR procedure is complete. The UE could generate the second BFR MAC CE if the BFR procedure is not complete.

The UE could discard the first BFR MAC CE. Additionally or alternatively, the UE could rebuild a MAC PDU which contains the first BFR MAC CE so that the MAC PDU contains the second BFR MAC CE and may not contain the first BFR MAC CE.

Figure 9:
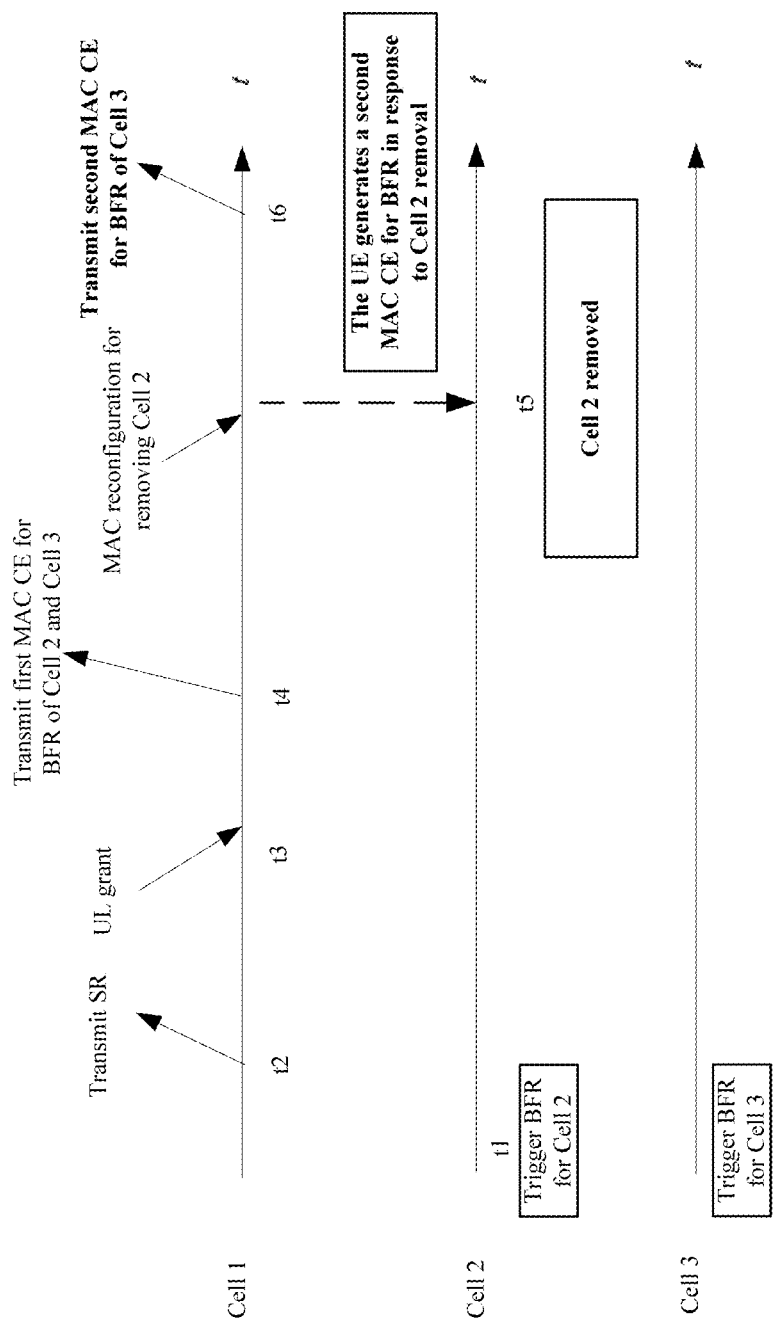
FIG. 9 is a diagram according to one exemplary embodiment.

An example is shown in FIG. 9. As shown in FIG. 9, a UE could be configured with 3 (activated) Serving Cells. A UE could trigger Beam failure recovery associated with Cell 2 and with Cell 3 at timing t1 (e.g. in response to beam failure indication from lower layers). The UE could perform a BFR procedure in response to triggered beam failure recovery. The UE could transmit a Scheduling request at t2 to a base station for requesting UL resources. The base station could indicate a UL grant at t3 via PDCCH. The UE could generate a first MAC CE (e.g. BFR MAC CE) associated with triggered BFR(s) based on the UL grant and transmit the first MAC CE to the base station at t4. The UE could receive a MAC reconfiguration message from the base station and removes Cell 2 in response to the MAC reconfiguration message at t5. The UE could generate a second MAC CE in response to the removal of Cell 2. The second MAC CE could contain beam failure information of Cell 3. The UE could transmit the second MAC CE at t6.

The first BFR MAC CE could be transmitted on a second cell different from the cell. The first BFR MAC CE could be transmitted on a cell different from the cell on which the second BFR MAC CE is transmitted. The UE may not generate the second MAC CE if all beam failure cells indicated in the first MAC CE are removed.

In Above Greneral Concept(s):

In one embodiment, the (first/second) cell (e.g. Cell 1, Cell 2, or Cell 3 in above examples) could be a secondary cell. Additionally or alternatively, the (first/second) cell could be a Primary Cell or a Serving Cell.

In one embodiment, the triggered BFR could be considered as pending before it is cancelled. The reset of the MAC entity could be associated with a RRC connection release indicated by the base station, a RRC connection reestablishment, and/or a (RRC) reconfiguration with sync (e.g. Handover).

In one embodiment, the RRC signaling could be a RRCReestablishment message, a RRCRelease message, and/or a RRCReconfiguration message.

In one embodiment, the MAC entity could be associated with a MCG or a SCG (e.g. The MAC entity is a MCG MAC entity or a SCG MAC entity).

In one embodiment, the removal associated with the cell could be removal of all (activated) (Secondary) cell(s) for which BFR was triggered, or removal of the cell or release of the cell or removal of one or more than one cells including the cell. The removal associated with the cell could be in response to the UE receiving a MAC reconfiguration from a base station. The removal associated with the cell could also be in response to receiving a RRC reconfiguration indicating SCell release (of the cell) via the base station.

In one embodiment, the removal associated with the cell may not be associated with reconfiguration with sync. The removal associated with the cell may not be associated with a procedure involving resetting a MAC (entity) of the UE. For example, the removal associated with the cell may not be associated with a reconfiguration with sync (e.g. Handover). As another example, the removal associated with the cell may not be associated with RRC connection release or RRC connection reestablishment.

The removal associated with the cell could be (performed) in response to a reconfiguration of a MAC entity requested by upper layers (e.g. RRC layer). Removal of a cell could correspond to remove a HARQ entity associated with the cell of the UE. Upon removing a cell, the UE could remove the corresponding HARQ entity of the cell. The triggered BFR could be considered as pending before it is cancelled.

In one embodiment, the UE could be configured with more than one Serving Cell(s). Beam failure information could include cell identity(s) indicating cells associated with beam failure. Beam failure information could indicate candidate beams associated with (activated) cells. Beam failure information could also indicate presence of candidate beams.

The BFR MAC CE could include beam failure information of one cell. The BFR MAC CE could include beam failure information of more than one cell(s).

In one embodiment, the UE could transmit the BFR MAC CE and/or SR on another cell different from the cell associated with (triggered) BFR. A BFR procedure could contain transmitting a Scheduling Request (SR) associated with a triggered BFR (and/or for SCell beam failure recovery). The BFR procedure could be transmitting a Scheduling Request associated with the trigger BFR. A BFR procedure could include transmitting a BFR MAC CE indicating beam failure information associated with failed Serving Cell(s). The BFR procedure could be transmitting a Scheduling Request associated with the trigger BFR (and/or for SCell beam failure recovery).

In one embodiment, a BFR procedure could be consider completed or finished when the UE receives PDCCH indicating an UL grant for a HARQ process used to transmit a BFR MAC CE associated with the BFR procedure. The cell could be in a cell group associated with the MAC entity.

In one embodiment, the UE could generate a BFR MAC CE if a triggered BFR (e.g. first triggered BFR) is not cancelled and if (or when) there are UL-SCH resources available for (new transmission and can) accommodating the BFR MAC CE plus its subheader (as a result of logical channel prioritization). The UE could trigger a Scheduling Request for SCell beam failure recovery if (1) a BFR is triggered (e.g. first triggered BFR) and not cancelled, and (2) if no UL-SCH resources are available for accommodating a BFR MAC CE plus its subheader (as a result of logical channel prioritization).

In one embodiment, if the number of beam failure instance indication associated with a cell (received from lower layers) is larger than or equal to a threshold, and the cell is a SCell, the UE could trigger a BFR (of the cell). The UE does not trigger a BFR if the cell is a PCell. The UE could determine whether to trigger the BFR at least based on the cell is PCell or SCell.

In one embodiment, the transmitting the Scheduling Request could be used for indicating to a serving gNB of a new SSB or a new CSI-RS when beam failure is detected on serving SSB(s) or serving CSI-RS(s). The UE could stop a timer for beam failure detection (e.g. beamFailureDetectionTimer) and/or a timer for a beam failure recovery procedure (e.g. beamFailureRecoveryTimer) in response to the reset of the MAC entity. The UE could reset a counter (e.g. BFI_COUNTER) for beam failure instance indication in response to the reset of the MAC entity. A failed Serving Cell could be a serving cell associated with a triggered (and not cancelled) BFR.

All concepts, examples, and embodiments above could be combined into new concept(s).

Figure 10:
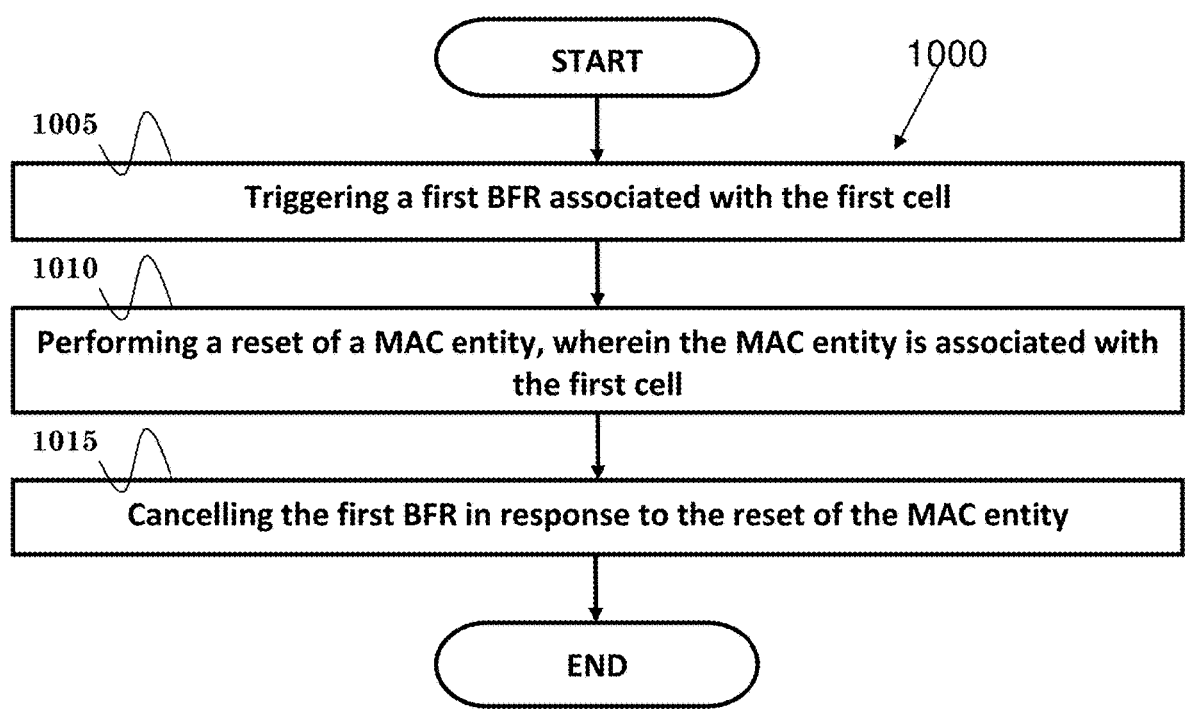
FIG. 10 is a flow chart according to one exemplary embodiment.

FIG. 10 is a flow chart 1000 according to one exemplary embodiment from the perspective of a UE configured, by a base station, with a first cell. In step 1005, the UE triggers a first BFR associated with the first cell. In step 1010, the UE performs a reset of a MAC entity, wherein the MAC entity is associated with the first cell. In step 1015, the UE cancels the first BFR in response to the reset of the MAC entity.

In one embodiment, the UE could stop (or cancel) a BFR procedure associated with the first BFR in response to the reset of the MAC entity. The UE may not transmit a BFR MAC CE associated with the first BFR after performing the (or in response to) reset of the MAC entity. The UE may not transmit beam failure information associated with the first BFR after performing (or in response to) the reset of the MAC entity. The UE may not transmit Scheduling request associated with the first BFR after performing (or in response to) the reset of the MAC entity.

In one embodiment, the UE could perform the reset of the MAC entity in response to a signaling transmitted by the base station. The UE may not cancel BFR associated with cells not associated with the MAC entity. In one embodiment, the first cell could be Primary Cell or Secondary Cell. The first cell is associated with a Master Cell Group (MCG) or a Second Cell Group (SCG). The MAC entity could be associated with a MCG or a SCG.

In one embodiment, the UE could be configured with more cells in addition to the first cell. Beam failure information could indicate cell identities of associated cell(s). Beam failure information could also indicate candidate beam (index(es)) for beam failure recovery of associated cell(s).

In one embodiment, the BFR procedure associated with a BFR could include transmitting a Scheduling Request to the base station. The BFR procedure associated with a BFR could also include transmitting (or retransmitting) a MAC CE associated with the BFR to the base station. Beam failure recovery could be triggered in response to beam failure indications received from a lower layer of the UE.

In one embodiment, the signaling could be a RRCrelease message, a RRCreestablishment message, or a RRCreconfiguration message.

Referring back to FIGS. 3 and 4, in one exemplary embodiment of a UE configured, by a base station, with a first cell. The UE 300 includes a program code 312 stored in the memory 310. The CPU 308 could execute program code 312 to enable the UE (i) to trigger a first BFR associated with the first cell, (ii) to perform a reset of a MAC entity, wherein the MAC entity is associated with the first cell, and (iii) to cancel the first BFR in response to the reset of the MAC entity. Furthermore, the CPU 308 can execute the program code 312 to perform all of the above-described actions and steps or others described herein.

Figure 11:
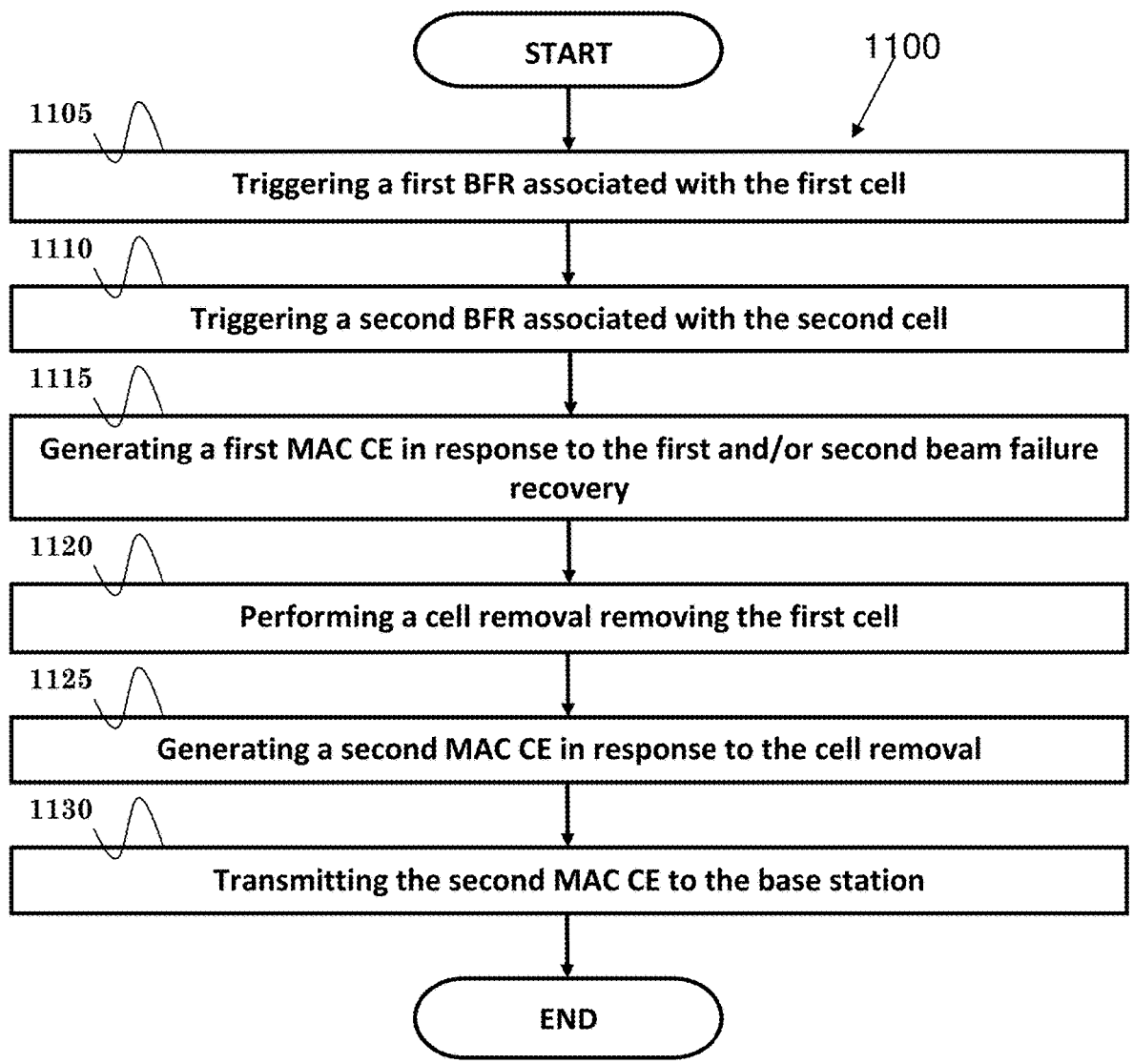
FIG. 11 is a flow chart according to one exemplary embodiment.

FIG. 11 is a flow chart 1100 according to one exemplary embodiment from the perspective of a UE configured, by a base station, with a first cell and a second cell. In step 1105, the UE triggers a first BFR associated with the first cell. In step 1110, the UE triggers a second BFR associated with the second cell. In step 1115, the UE generates a first MAC CE in response to the first and/or second beam failure recovery. In step 1120, the UE performs a cell removal removing the first cell. In step 1125, the UE generates a second MAC CE in response to the cell removal. In step 1130, the UE transmits the second MAC CE to the base station.

In one embodiment, the UE could remove the first cell in response to a RRC signaling transmitted by the base station, wherein the RRC signaling indicates at least removal of the first cell. The UE could also remove the first cell in response to reconfiguration of a MAC entity requested by upper layers of the UE (e.g. RRC layer). The UE may not transmit the first MAC CE if the UE generates the second MAC CE.

In one embodiment, the UE could cancel the first BFR in response to the cell removal. The UE may not stop a BFR procedure associated with the first BFR and the second BFR in response to the cell removal.

In one embodiment, the UE could transmit the first MAC CE on the first cell, the second cell, or other activated cells. The UE could also transmit the first MAC CE and the second MAC CE on different cells. In addition, the UE could transmit the first MAC CE and the second MAC CE on a same cell.

Referring back to FIGS. 3 and 4, in one exemplary embodiment of a UE configured, by a base station, with a first cell and a second cell. The UE 300 includes a program code 312 stored in the memory 310. The CPU 308 could execute program code 312 to enable the UE (i) to trigger a first BFR associated with the first cell, (ii) to trigger a second BFR associated with the second cell, (iii) to generate a first MAC CE in response to the first and/or second beam failure recovery, (iv) to perform a cell removal removing the first cell, (v) to generate a second MAC CE in response to the cell removal, and (vi) to transmit the second MAC CE to the base station. Furthermore, the CPU 308 can execute the program code 312 to perform all of the above-described actions and steps or others described herein.

Figure 12:
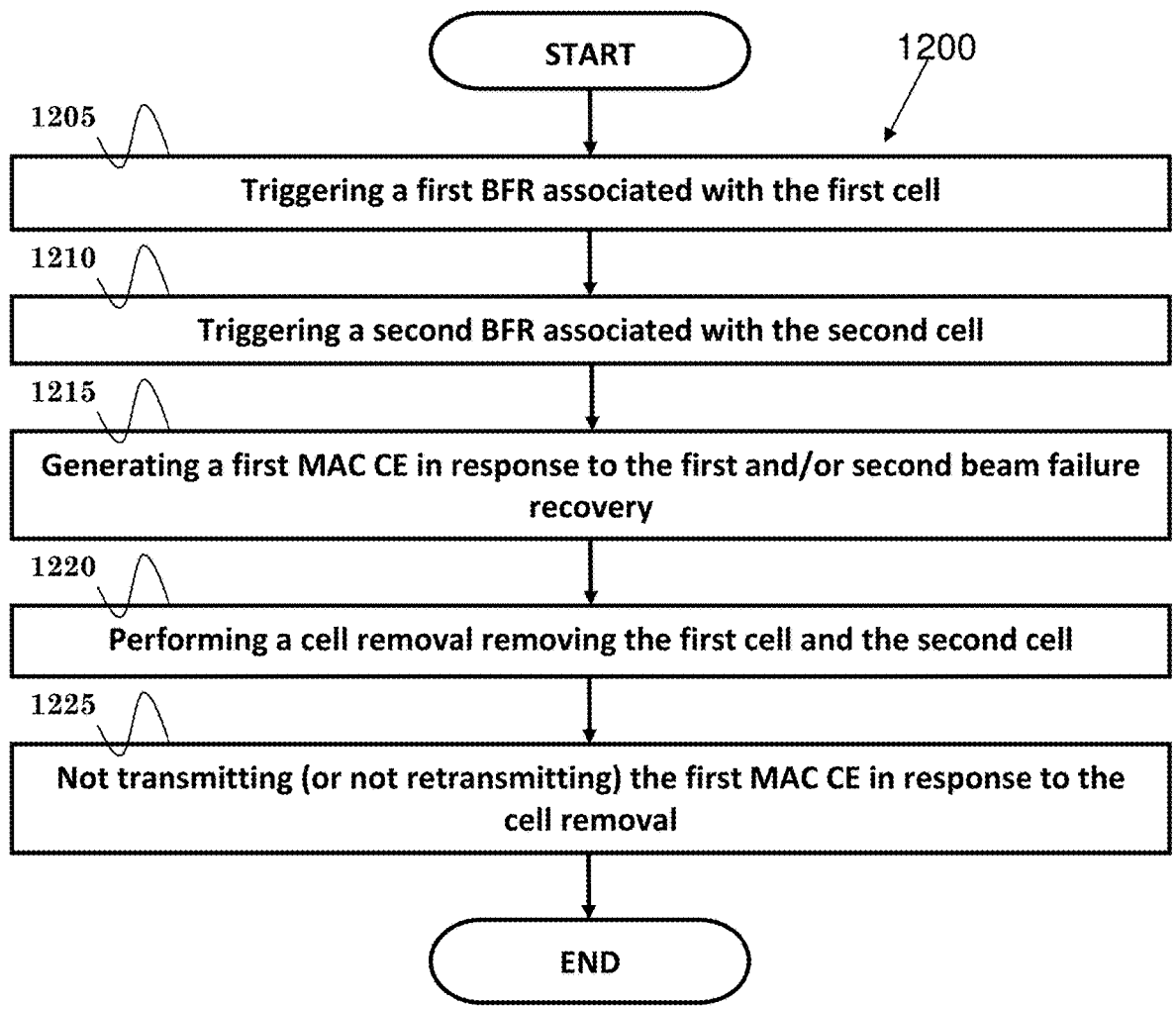
FIG. 12 is a flow chart according to one exemplary embodiment.

FIG. 12 is a flow chart 1200 according to one exemplary embodiment from the perspective of a UE configured, by a base station, a first cell and a second cell. In step 1205, the UE triggers a first BFR associated with the first cell. In step 1210, the UE triggers a second BFR associated with the second cell. In step 1215, the UE generates a first MAC CE in response to the first and/or second beam failure recovery. In step 1220, the UE performs a cell removal removing the first cell and the second cell. In step 1225, the UE does not transmit (or does not retransmit) the first MAC CE in response to the cell removal.

In one embodiment, the UE could cancel the first BFR in response to the cell removal. The UE could cancel the second BFR in response to the cell removal. The UE could stop a BFR procedure associated with the first and the second BFR in response to the cell removal. The UE could perform the cell removal in response to a RRC signaling transmitted by the base station.

In one embodiment, the UE could remove the first cell and the second cell in response to a RRC signaling transmitted by the base station, wherein the RRC signaling indicates at least removal of the first cell and the second cell. The UE could also remove the first cell in response to reconfiguration of a MAC entity requested by upper layers of the UE. In addition, the UE could remove the second cell in response to reconfiguration of a MAC entity requested by upper layers of the UE.

In one embodiment, the first MAC CE could indicate beam failure information associated with the first cell and the second cell. The second MAC CE could indicate beam failure information associated with the second cell. The second MAC CE may not indicate beam failure information associated with the first cell.

In one embodiment, the first cell and/or the second cell could be Secondary Cell(s). The first cell and/or the second cell could be a Primary Cell(s).

In one embodiment, the UE could be configured with more cells in addition to the first cell and the second cell. Beam failure information could indicate cell identities of associated cell(s). Beam failure information could also indicate candidate beam (index(s)) for beam failure recovery of associated cell(s).

In one embodiment, the BFR procedure associated with a BFR may include transmitting a Scheduling Request to the base station. The BFR procedure associated with a BFR may also include transmitting (or retransmitting) a MAC CE associated with the BFR to the base station.

In one embodiment, beam failure recovery could be triggered in response to beam failure indications received from a lower layer of the UE. The upper layers could be Non-Access Stratum (NAS) layers of the UE. The cell removal may correspond to removing one or more corresponding HARQ entities associated with removed cells.

Referring back to FIGS. 3 and 4, in one exemplary embodiment of a UE configured, by a base station, with a first cell and a second cell. The UE 300 includes a program code 312 stored in the memory 310. The CPU 308 could execute program code 312 to enable the UE (i) to trigger a first BFR associated with the first cell, (ii) to triggers a second BFR associated with the second cell, (iii) to generate a first MAC CE in response to the first and/or second beam failure recovery, (iv) to perform a cell removal removing the first cell and the second cell, and (v) to not transmit (or does not retransmit) the first MAC CE in response to the cell removal. Furthermore, the CPU 308 can execute the program code 312 to perform all of the above-described actions and steps or others described herein.

Possible text proposals to 3GPP TS 38.321 are shown below:

=Option 1 start (Section 5.12)=
5.12 MAC Reset
  If a reset of the MAC entity is requested by upper layers, the MAC entity shall:
    1> initialize Bj for each logical channel to zero;
    1> stop (if running) all timers;
    1> consider all timeAlignmentTimers as expired and perform the corresponding actions in clause 5.2;
    1> set the NDIs for all uplink HARQ processes to the value 0;
    1> stop, if any, ongoing RACH procedure;
    1> discard explicitly signalled contention-free Random Access Resources, if any;
    1> flush Msg3 buffer;
    1> cancel, if any, triggered Scheduling Request procedure;
    1> cancel, if any, triggered Buffer Status Reporting procedure;
    1> cancel, if any, triggered Power Headroom Reporting procedure;
    1> cancel, if any, triggered SCell beam failure recovery procedure.
    1> flush the soft buffers for all DL HARQ processes;
    1> for each DL HARQ process, consider the next received transmission for a TB as the very first transmission;
    1> release, if any, Temporary C-RNTI;
    1> reset BFI_COUNTER.
===========================Option 1 end (Section 5.12)===========================
===========================Option 2 start (Section 5.12)===========================
5.12 MAC Reset
  If a reset of the MAC entity is requested by upper layers, the MAC entity shall:
    1> initialize Bj for each logical channel to zero;
    1> stop (if running) all timers;
    1> consider all timeAlignmentTimers as expired and perform the corresponding actions in clause 5.2;
    1> set the NDIs for all uplink HARQ processes to the value 0;
    1> stop, if any, ongoing RACH procedure;
    1> discard explicitly signalled contention-free Random Access Resources, if any;
    1> flush Msg3 buffer;
    1> cancel, if any, triggered Scheduling Request procedure;
    1> cancel, if any, triggered Buffer Status Reporting procedure;
    2> cancel, if any, triggered Power Headroom Reporting procedure;
    2> cancel, if any, triggered BFR.
    1> flush the soft buffers for all DL HARQ processes;
    1> for each DL HARQ process, consider the next received transmission for a TB as the very first transmission;
    1> release, if any, Temporary C-RNTI;
    1> reset BFI_COUNTER.
===========================Option 2 end (Section 5.12)===========================

Figure 13:
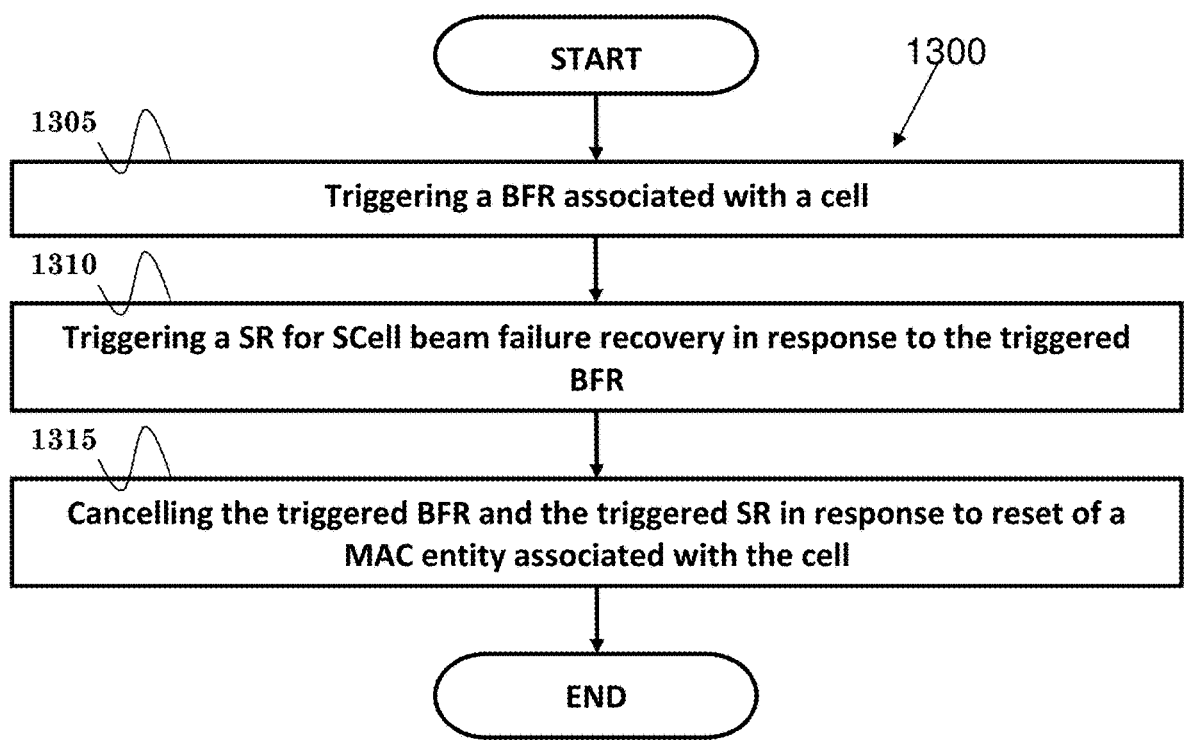
FIG. 13 is a flow chart according to one exemplary embodiment.

FIG. 13 is a flow chart 1300 according to one exemplary embodiment from the perspective of a UE. In step 1305, the UE triggers a BFR associated with a cell. In step 1310, the UE triggers a SR for SCell beam failure recovery in response to the triggered BFR. In step 1315, the UE cancels the triggered BFR and the triggered SR in response to reset of a MAC entity associated with the cell.

In one embodiment, the cell could be a SCell associated with a MCG or a SCG. The UE could generate a BFR MAC CE if the triggered BFR is not cancelled and if UL-SCH resources are available for accommodating the BFR MAC CE plus its subheader.

In one embodiment, the triggering of the Scheduling Request for SCell beam failure recovery could be performed if the triggered BFR is not cancelled and if no UL-SCH resources are available for accommodating a BFR MAC CE plus its subheader. The reset of the MAC entity could be performed during a RRC reconfiguration with sync procedure, a RRC connection reestablishment procedure, or a RRC connection release procedure.

In one embodiment, the UE may stop a random access procedure (initiated in response to the triggered BFR) in response to the reset of the MAC entity. The UE may reset a counter for beam failure instance indication in response to the reset of the MAC entity. The UE may stop a timer for beam failure detection and a timer for a beam failure recovery procedure in response to the reset of the MAC entity. The UE could determine whether to trigger the BFR based on if the cell is a Secondary Cell (e.g. based on whether the cell is SCell or not). In one embodiment, the UE could transmit the SR on another cell different from the cell.

Referring back to FIGS. 3 and 4, in one exemplary embodiment of a UE, the UE 300 includes a program code 312 stored in the memory 310. The CPU 308 could execute program code 312 to enable the UE (i) to trigger a BFR associated with a cell, (ii) to trigger a SR for SCell beam failure recovery in response to the triggered BFR, and (iii) to cancel the triggered BFR and the triggered SR in response to reset of a MAC entity associated with the cell. Furthermore, the CPU 308 can execute the program code 312 to perform all of the above-described actions and steps or others described herein.

Various aspects of the disclosure have been described above. It should be apparent that the teachings herein could be embodied in a wide variety of forms and that any specific structure, function, or both being disclosed herein is merely representative. Based on the teachings herein one skilled in the art should appreciate that an aspect disclosed herein could be implemented independently of any other aspects and that two or more of these aspects could be combined in various ways. For example, an apparatus could be implemented or a method could be practiced using any number of the aspects set forth herein. In addition, such an apparatus could be implemented or such a method could be practiced using other structure, functionality, or structure and functionality in addition to or other than one or more of the aspects set forth herein. As an example of some of the above concepts, in some aspects concurrent channels could be established based on pulse repetition frequencies. In some aspects concurrent channels could be established based on pulse position or offsets. In some aspects concurrent channels could be established based on time hopping sequences. In some aspects concurrent channels could be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/ processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method for a User Equipment (UE), comprising:
   triggering a Beam Failure Recovery (BFR) associated with a cell;
   triggering a Scheduling Request (SR) for Secondary Cell (SCell) beam failure recovery in response to the triggered BFR when no Uplink Shared Channel (UL-SCH) resources are available for accommodating a BFR Medium Access Control (MAC) Control Element (CE) plus its subheader; and
   cancelling the triggered BFR and the triggered SR in response to reset of a Medium Access Control (MAC) entity associated with the cell.

2. The method of claim 1, wherein the cell is a SCell associated with a Master Cell Group (MCG) or a Secondary Cell Group (SCG).

3. The method of claim 1, wherein the UE generates the BFR MAC CE in response to the triggered BFR when UL-SCH resources are available for accommodating the BFR MAC CE plus its subheader.

4. The method of claim 1, further comprising:
   determining to trigger the BFR based on at least whether the cell is a SCell or not, wherein the UE does not trigger the BFR when the cell is a Primary Cell (PCell).

5. The method of claim 1, wherein the reset of the MAC entity is performed during a Radio Resource Control (RRC) reconfiguration with sync procedure, a RRC connection reestablishment procedure, or a RRC connection release procedure.

6. The method of claim 1, wherein the UE stops a random access procedure in response to the reset of the MAC entity, wherein the random access procedure is initiated in response to the triggered BFR.

7. The method of claim 1, wherein the UE resets a counter for beam failure instance indication in response to the reset of the MAC entity.

8. The method of claim 1, wherein the UE stops a timer for beam failure detection and a timer for a beam failure recovery procedure in response to the reset of the MAC entity.

9. The method of claim 1, wherein the UE determines whether to trigger the BFR based on whether the cell is a SCell or not.

10. The method of claim 1, wherein the UE transmits the SR on another cell different from the cell.

11. A User Equipment (UE), comprising:
    a control circuit;
    a processor installed in the control circuit; and
    a memory installed in the control circuit and operatively coupled to the processor;
    wherein the processor is configured to execute a program code stored in the memory to:
       trigger a Beam Failure Recovery (BFR) associated with a cell;
       trigger a Scheduling Request (SR) for Secondary Cell (SCell) beam failure recovery in response to the triggered BFR when no Uplink Shared Channel (UL-SCH) resources are available for accommodating a BFR Medium Access Control (MAC) Control Element (CE) plus its subheader; and
       cancel the triggered BFR and the triggered SR in response to reset of a Medium Access Control (MAC) entity associated with the cell.

12. The UE of claim 11, wherein the cell is a SCell associated with a Master Cell Group (MCG) or a Secondary Cell Group (SCG).

13. The UE of claim 11, wherein the processor is further configured to execute a program code stored in the memory to:
    generate the BFR MAC CE in response to the triggered BFR when UL-SCH resources are available for accommodating the BFR MAC CE plus its subheader.

14. The UE of claim 11, wherein the processor is further configured to execute the program code stored in the memory to:
    determine to trigger the BFR based on at least whether the cell is a SCell or not, wherein the UE does not trigger the BFR when the cell is a Primary Cell (PCell).

15. The UE of claim 11, wherein the reset of the MAC entity is performed during a Radio Resource Control (RRC) reconfiguration with sync procedure, a RRC connection reestablishment procedure, or a RRC connection release procedure.

16. The UE of claim 11, wherein the processor is further configured to execute a program code stored in the memory to:
    stop a random access procedure in response to the reset of the MAC entity, wherein the random access procedure is initiated in response to the triggered BFR.

17. The UE of claim 11, wherein the processor is further configured to execute a program code stored in the memory to:
    reset a counter for beam failure instance indication in response to the reset of the MAC entity.

18. The UE of claim 11, wherein the processor is further configured to execute a program code stored in the memory to:
    stop a timer for beam failure detection and a timer for a beam failure recovery procedure in response to the reset of the MAC entity.

19. The UE of claim 11, wherein the processor is further configured to execute a program code stored in the memory to:
    determine whether to trigger the BFR based on whether the cell is a SCell or not.

20. The UE of claim 11, wherein the processor is further configured to execute a program code stored in the memory to:
    transmit the SR on another cell different from the cell.

* * * * *